(12) United States Patent
Ahn

(10) Patent No.: US 11,498,654 B2
(45) Date of Patent: Nov. 15, 2022

(54) AUTOMATED SYSTEM AND METHOD FOR PREPARING A MANDREL FOR USE IN COMPOSITE STRINGER MANUFACTURING

(71) Applicant: The Boeing Company, Chicago, IL (US)

(72) Inventor: Jonathan Ahn, Seattle, WA (US)

(73) Assignee: The Boeing Company, Chicago, IL (US)

( * ) Notice: Subject to any disclaimer, the term of this patent is extended or adjusted under 35 U.S.C. 154(b) by 150 days.

(21) Appl. No.: 16/876,586

(22) Filed: May 18, 2020

(65) Prior Publication Data

US 2021/0354805 A1 Nov. 18, 2021

(51) Int. Cl.
*B64C 1/06* (2006.01)
*B29C 33/50* (2006.01)
*B64F 5/10* (2017.01)
*B29L 31/30* (2006.01)

(52) U.S. Cl.
CPC .......... *B64C 1/064* (2013.01); *B29C 33/505* (2013.01); *B64F 5/10* (2017.01); *B29L 2031/3076* (2013.01)

(58) Field of Classification Search
CPC ......... B64C 1/064; B64C 5/10; B29C 33/505; B29C 70/30; B29C 53/821; B29C 53/825; B29L 2031/3076; B29L 2031/3085
See application file for complete search history.

(56) References Cited

U.S. PATENT DOCUMENTS

| | | | | | |
|---|---|---|---|---|---|
| 3,068,133 A | * | 12/1962 | Cilker | .................... | B29C 70/32 156/428 |
| 3,686,744 A | * | 8/1972 | Mazuir | .................... | B29C 53/78 493/299 |
| 3,700,519 A | * | 10/1972 | Carter | .................... | B29C 53/60 156/289 |
| 4,053,343 A | * | 10/1977 | Carter | .................... | B29C 48/15 156/289 |
| 4,054,474 A | * | 10/1977 | Collins, III | ............. | B65B 53/06 53/399 |
| 4,078,957 A | * | 3/1978 | Bradt | ................... | B29C 66/4322 156/289 |
| 4,788,759 A | * | 12/1988 | Yano | .................... | B29C 70/347 29/894.1 |
| 4,867,824 A | * | 9/1989 | Gill | ....................... | B29C 53/825 156/428 |

(Continued)

*Primary Examiner* — Leith S Shafi

(57) ABSTRACT

A system includes a U-shaped chute, one or more feeder mechanisms, a sock application assembly, and a film application assembly. The chute has a chute inlet and a chute outlet and is configured to receive a mandrel having a mandrel length. The one or more feeder mechanisms are configured to move the mandrel into the chute inlet and through the chute. The sock application assembly has a sock material spool containing a breather sock in tubular form. The sock application assembly is configured to progressively apply the breather sock over the mandrel length as the mandrel exits the chute outlet. The film application assembly has a film material spool containing a film in tubular form. The film application assembly is configured to progressively apply the film over the breather sock covering the mandrel exiting the sock application assembly to thereby form a film-sock-mandrel assembly.

20 Claims, 36 Drawing Sheets

(56) References Cited

U.S. PATENT DOCUMENTS

| | | | | |
|---|---|---|---|---|
| 5,867,824 | A * | 2/1999 | Saito | G06Q 10/0631 |
| | | | | 709/239 |
| 11,274,015 | B2 * | 3/2022 | Tanigawa | B29C 63/24 |
| 2002/0032370 | A1 * | 3/2002 | Kamata | A61B 1/018 |
| | | | | 600/140 |
| 2006/0127635 | A1 * | 6/2006 | Colson | B32B 41/00 |
| | | | | 428/113 |
| 2013/0086873 | A1 * | 4/2013 | Bahr | B29C 66/43 |
| | | | | 53/442 |
| 2016/0303347 | A1 * | 10/2016 | Porter | B29C 48/157 |
| 2021/0354337 | A1 * | 11/2021 | Whiting | B64C 1/064 |
| 2021/0354403 | A1 * | 11/2021 | Jones | B29C 70/54 |

* cited by examiner

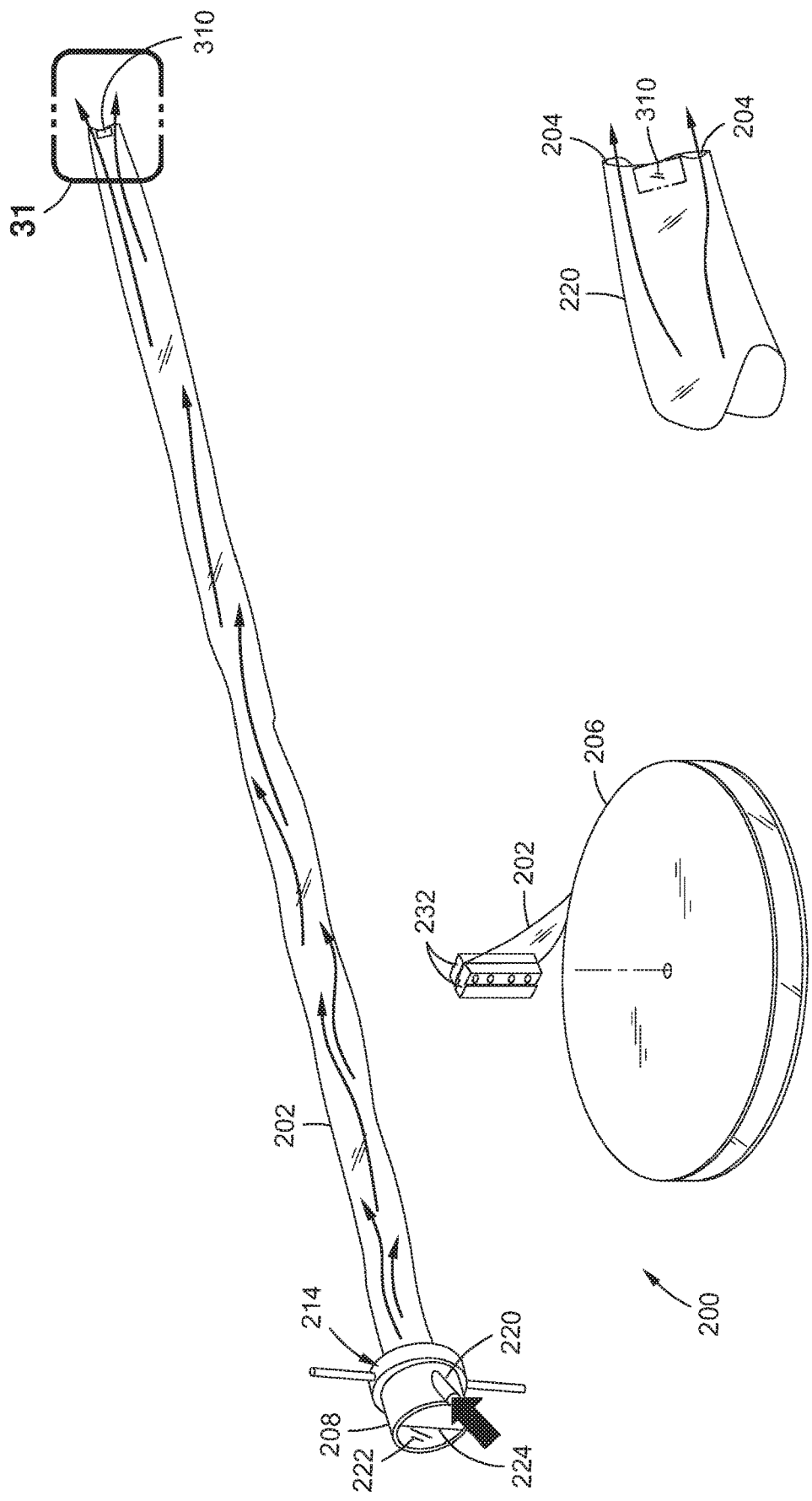
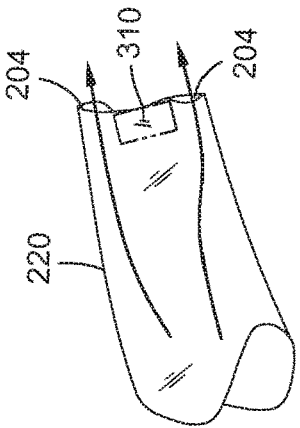
FIG. 30
FIG. 31

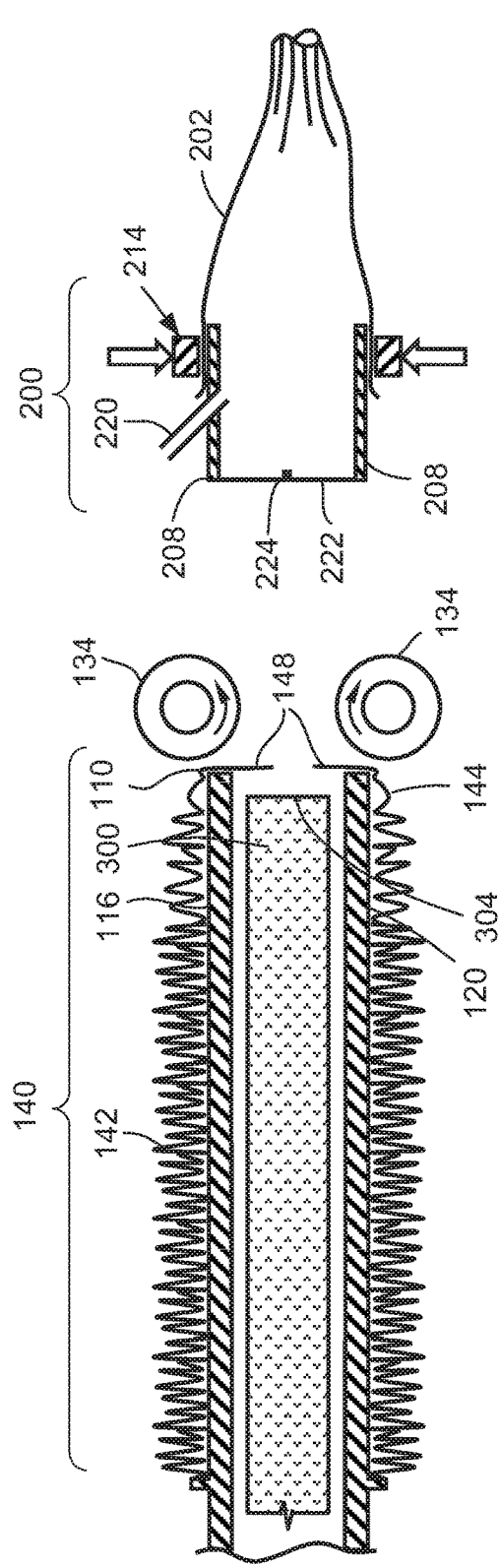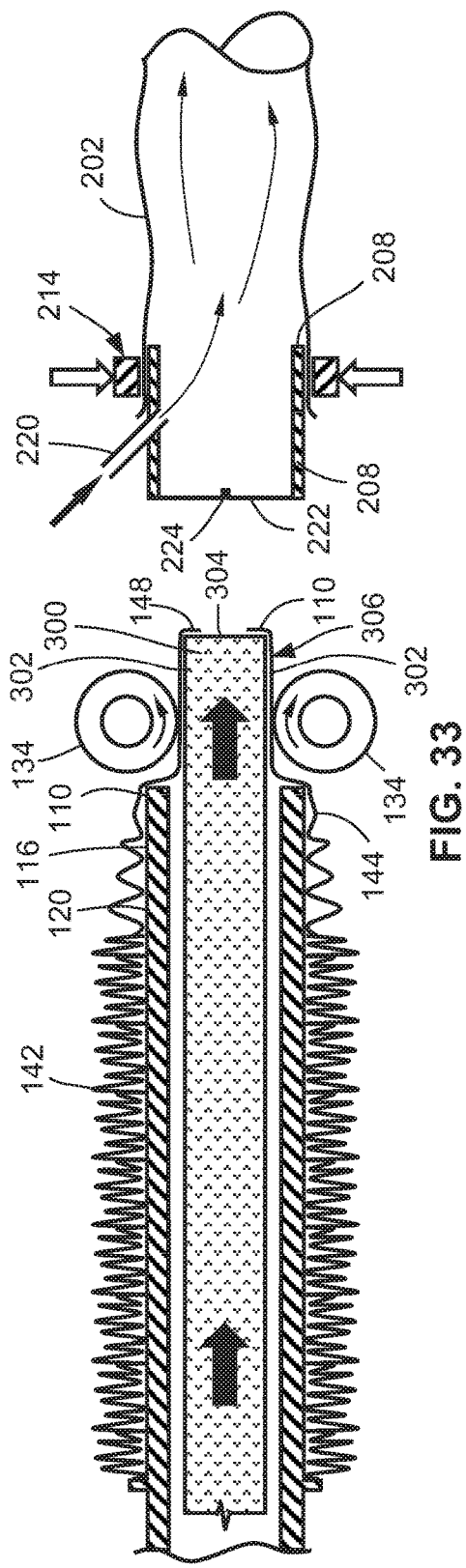

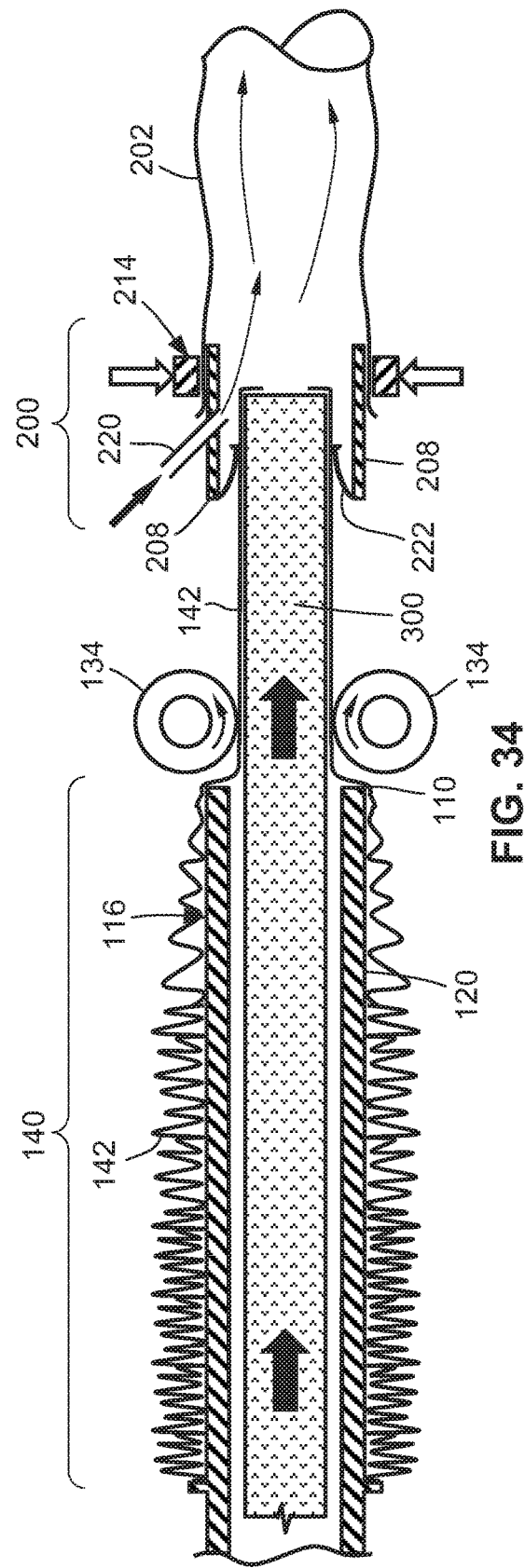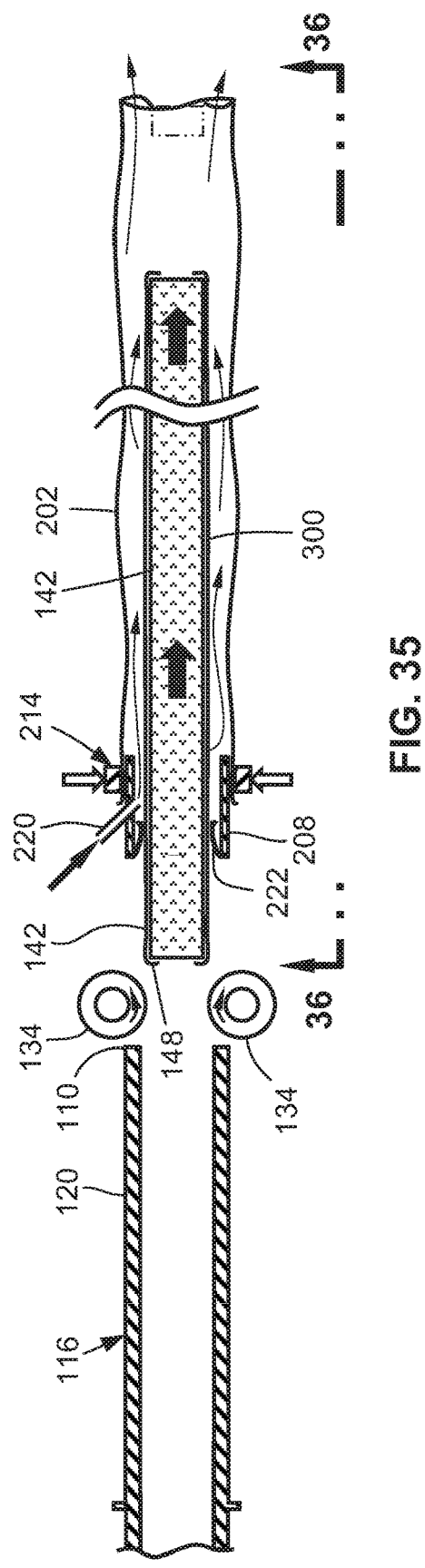
FIG. 34
FIG. 35

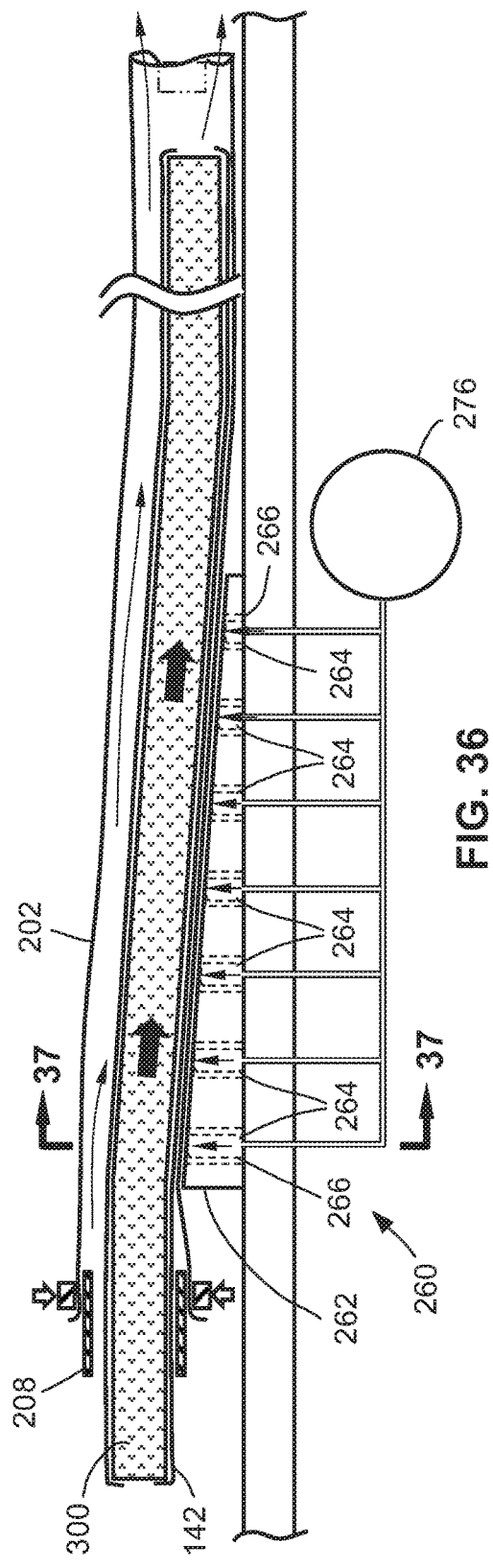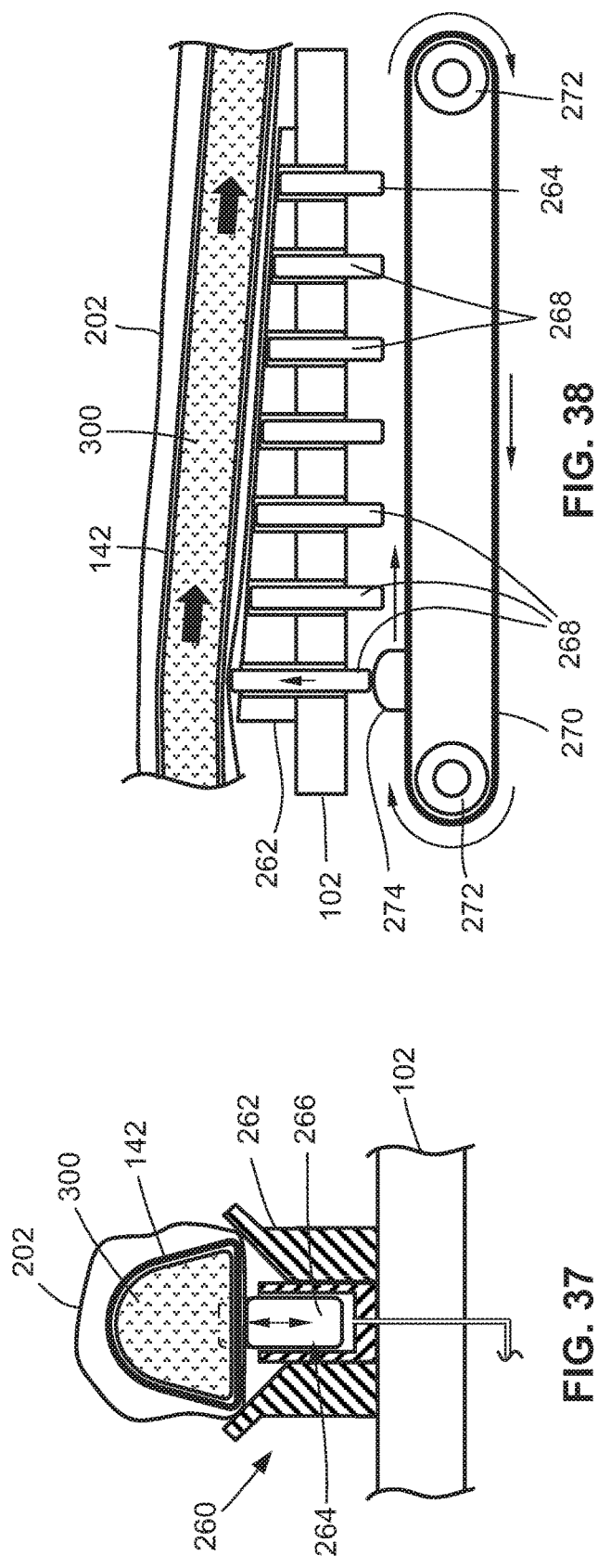

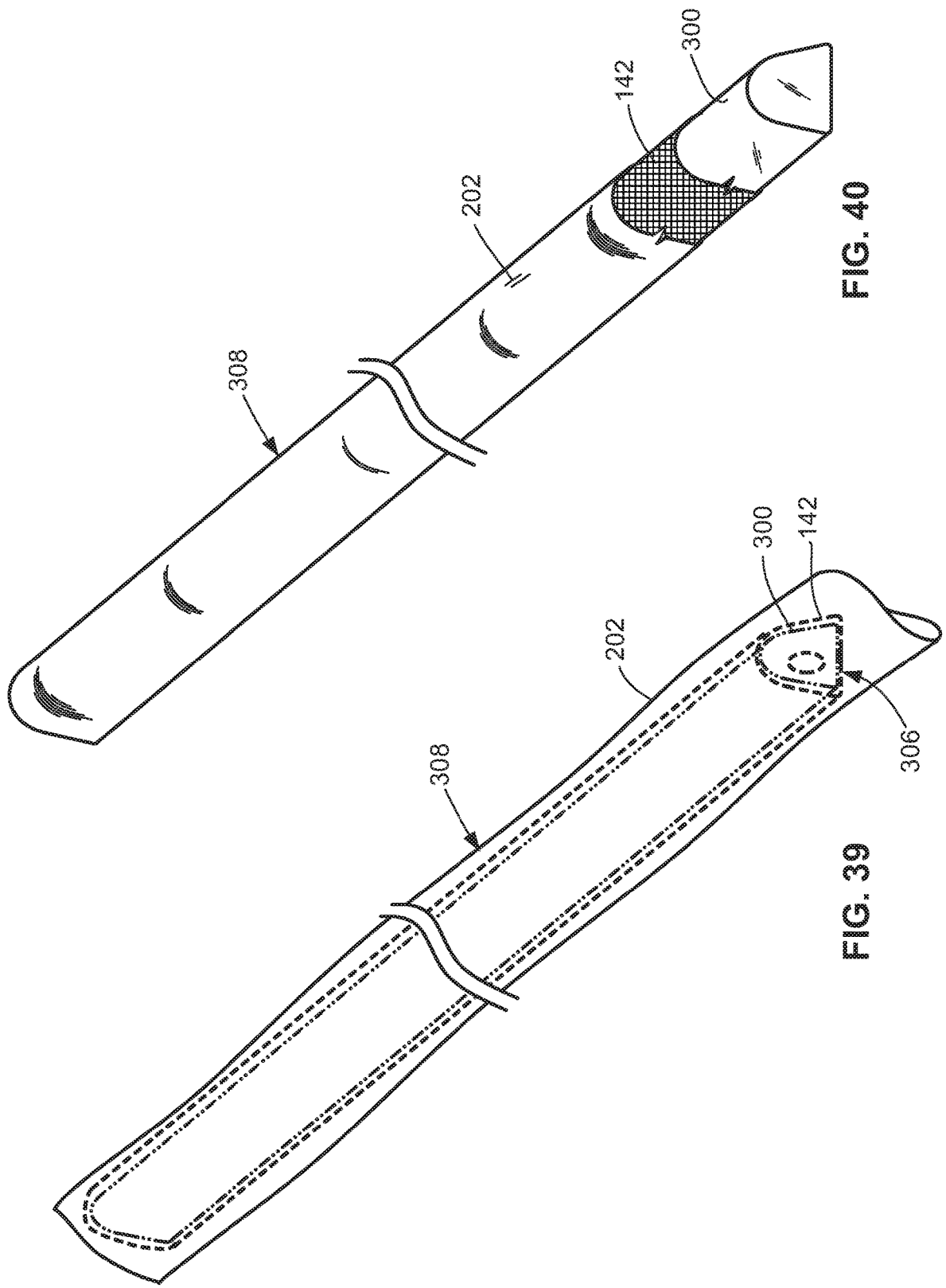

AUTOMATED SYSTEM AND METHOD FOR PREPARING A MANDREL FOR USE IN COMPOSITE STRINGER MANUFACTURING

FIELD

The present disclosure relates generally to inspection systems and, more particularly, to a system and method for preparing a mandrel for use in manufacturing a composite stringer.

BACKGROUND

Composite materials are used in a wide variety of applications due to their favorable properties such as high specific strength, high specific stiffness, and high corrosion resistance. The manufacturing of a composite structure typically involves the layup of multiple plies of composite laminate material to form a composite laminate. The layup material is typically a fibrous material that is pre-impregnated with resin (e.g., prepreg). For example, the layup material may be epoxy-impregnated carbon fiber prepreg.

Certain composite structures include a composite skin member and a plurality of composite stringers coupled to the skin for increasing the stiffness of the composite structure. For example, a composite wing of an aircraft may include a composite skin panel and a plurality of longitudinally extending composite stringers located on the skin inner surface. The composite stringers are typically individually laid up and formed, and then mounted on an assembly tool which is then overlaid with composite material to form a composite skin panel. The panel-stringer assembly may be co-bonded or co-cured to form a composite wing skin.

Prior to forming each composite stringer, a rubber mandrel must typically be assembled with the unformed composite stringer to maintain the shape of the composite stringer during forming. The mandrel must be prepared for assembling with the composite stringer by applying a breather layer over the length of the mandrel, followed by applying a release film over the breather layer. Conventional methods for applying the breather layer and the release film over a mandrel are manual processes that are labor-intensive and time-consuming. In addition, the long length of certain mandrels require a large amount of production floor space for preparing the mandrels.

As can be seen, there exists a need in the art for a system and method for preparing mandrels for use in composite stringer manufacturing and which avoids the above-noted challenges associated with conventional mandrel preparation methods.

SUMMARY

The above-noted needs associated with preparing mandrels of use in composite stringer manufacturing are addressed by the presently-disclosed system which includes a U-shaped chute, one or more feeder mechanisms, a sock application assembly, and a film application assembly. The chute has a chute inlet and a chute outlet and is configured to receive a mandrel having a mandrel length. The one or more feeder mechanisms are configured to move the mandrel into the chute inlet and through the chute. The sock application assembly has a sock material spool containing a continuous length of a breather sock in tubular form. The sock application assembly is configured to gradually or progressively apply the breather sock over the mandrel length as the mandrel exits the chute outlet. The film application assembly has a film material spool containing a continuous length of a film in tubular form. The film application assembly is configured to progressively apply the film over the breather sock covering the mandrel exiting the sock application assembly to thereby form a film-sock-mandrel assembly.

Also disclosed is a method of preparing a mandrel for use in composite stringer manufacturing. The method includes moving, through a U-shaped chute, a mandrel having a mandrel length. The method additionally includes progressively applying, using a sock application assembly, a breather sock in tubular form over the mandrel length as the mandrel exits a chute outlet of the chute. In addition, the method includes progressively applying, using a film application assembly, a film in tubular form over the breather sock covering the mandrel as the mandrel exits the sock application assembly to thereby form a film-sock-mandrel assembly The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 30 shows the film extended along a downstream direction due to the injection of air at the air injection port;

FIG. 31 is a magnified view of a portion of the system identified by reference numeral 31 of FIG. 30 and illustrating the end of the film heat sealed with one or more air holes to allow the injected air to escape as the mandrel is inserted into the film;

FIG. 32 is a side sectional view of the sock reservoir and film collar showing the gathered arrangement of the breather sock on the sock reservoir;

FIG. 33 shows the mandrel engaging a sock overhang of the breather sock as the mandrel exits the chute outlet, and further showing the progressive application of the breather sock over the mandrel to form a sock-mandrel assembly;

FIG. 34 shows the sock mandrel assembly entering the film collar as air is injected into the film;

FIG. 35 shows the insertion of the sock-mandrel assembly into the film to form a film-sock-mandrel assembly;

FIG. 36 is a side sectional view of an example of a mandrel shaker located downstream of the film collar and configured to urge the final section of the mandrel into the film once the upstream end of the mandrel has moved past the feeder mechanisms at the chute outlet;

FIG. 37 is a cross-sectional view of an example of a mandrel shaker having a generally V-shaped trough and a plurality of mandrel vibration devices configured as a vertically-oriented shaker actuators for vibrating the mandrel;

FIG. 38 is a side view of an example of the mandrel shaker having a plurality of mandrel vibration devices configured as a plurality of vertically-oriented thrusting elements configured to be periodically urged upwardly by a boss mounted on a continuous loop belt positioned underneath the thrusting elements;

FIG. 39 is a perspective view of an example of a film-sock-mandrel assembly showing the film loosely covering the mandrel;

FIG. 40 is a perspective view of the film-sock-mandrel assembly after the film has been heat shrunk such as by a heat shrink device located downstream of the film application assembly;

DETAILED DESCRIPTION

Figure 1:
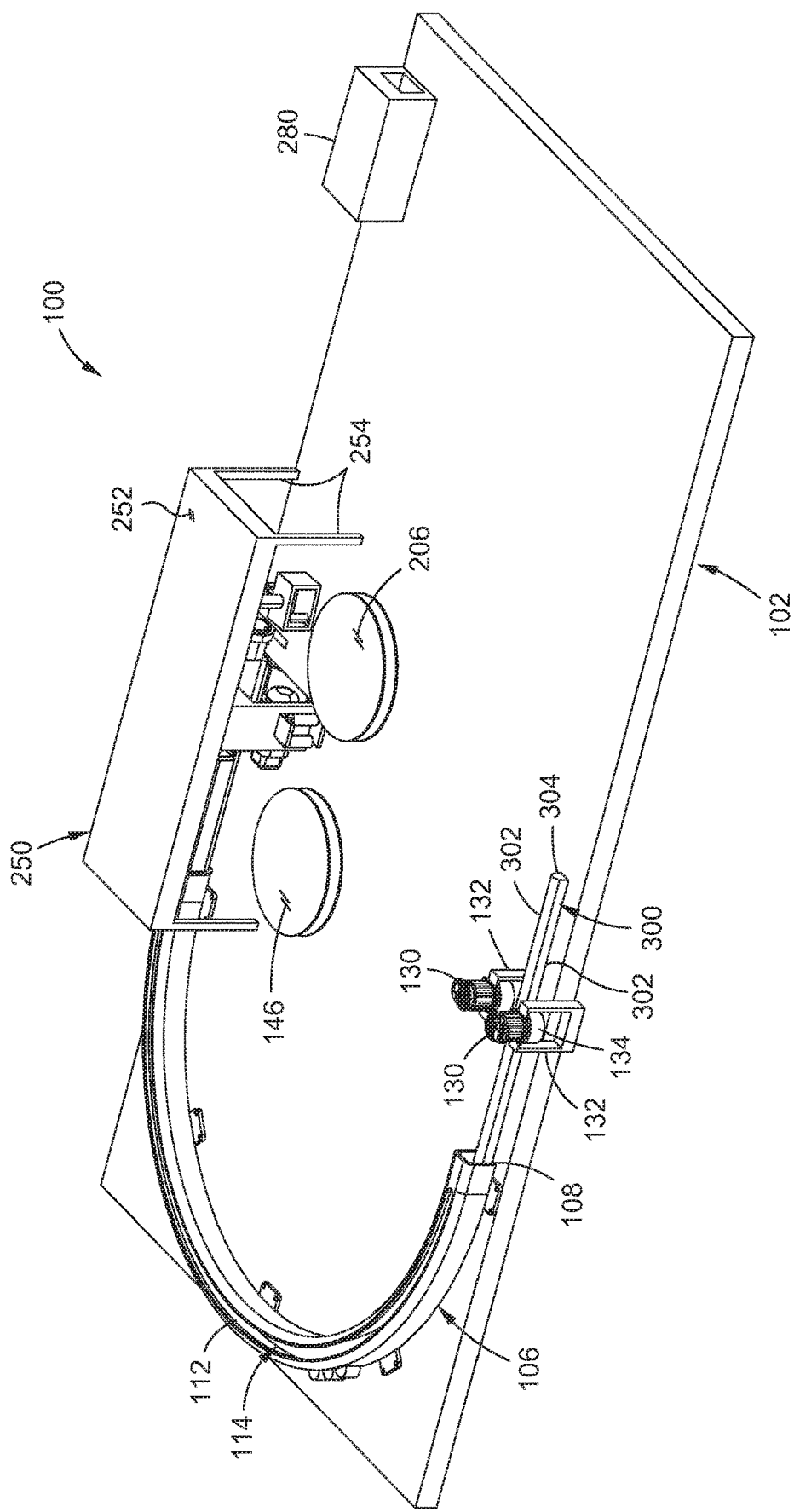
FIG. 1 is a perspective view of an example of a system for automated preparation of a mandrel for use in manufacturing a composite stringer.
Figure 2:
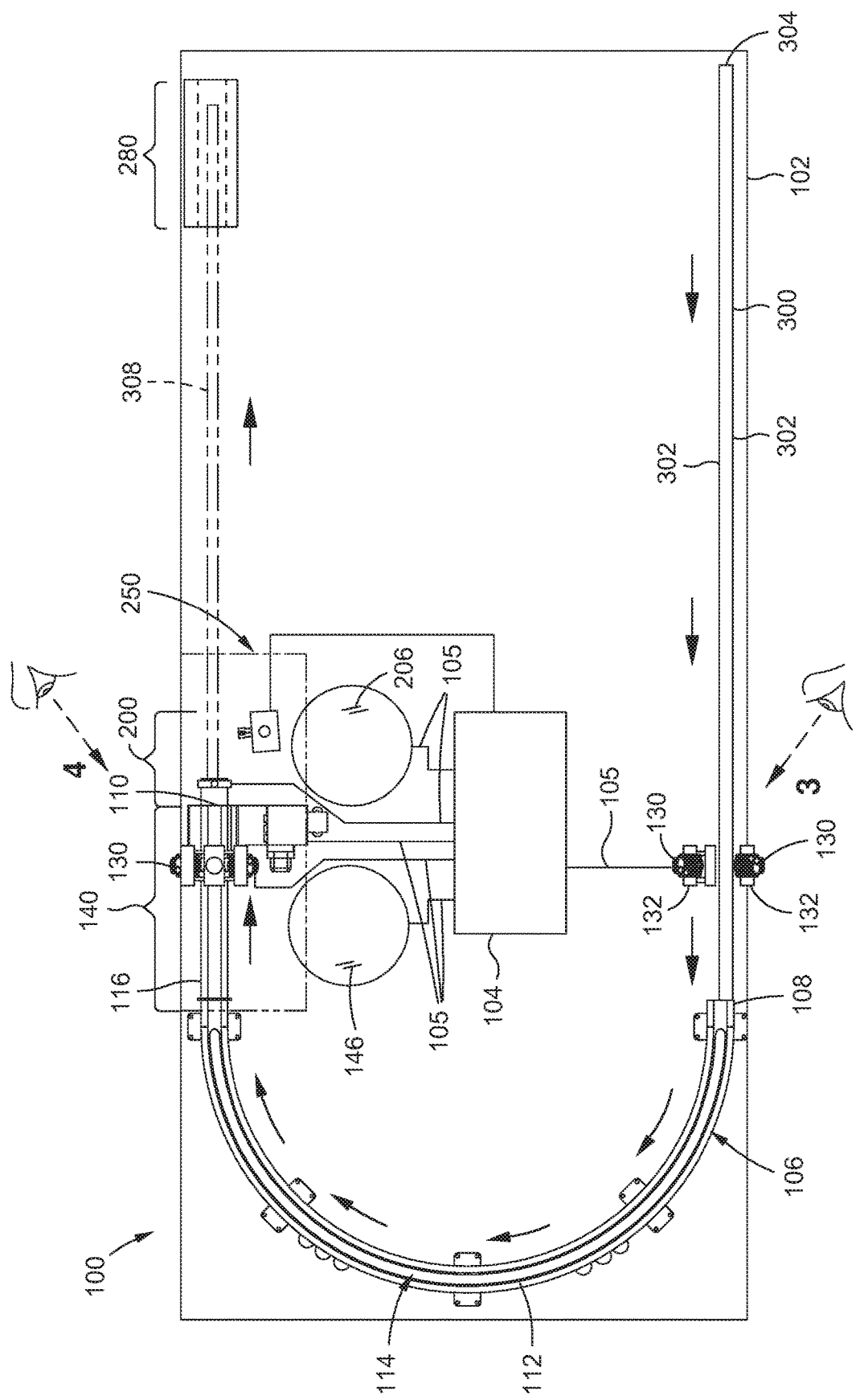
FIG. 2 is a top view of the system of FIG. 1 and illustrating a U-shaped chute configured to receive the mandrel.
Figure 44:
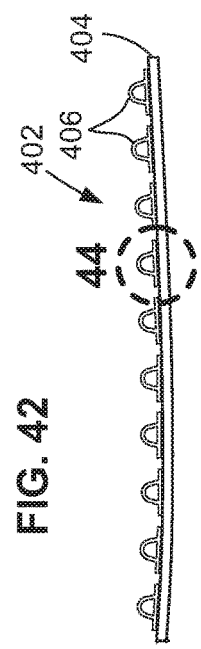
FIG. 44 is a magnified view of a portion of the system identified by reference numeral 44 of FIG. 43 and illustrating a cross-sectional view of an example of a composite stringer coupled to a composite skin panel.
Figure 45:
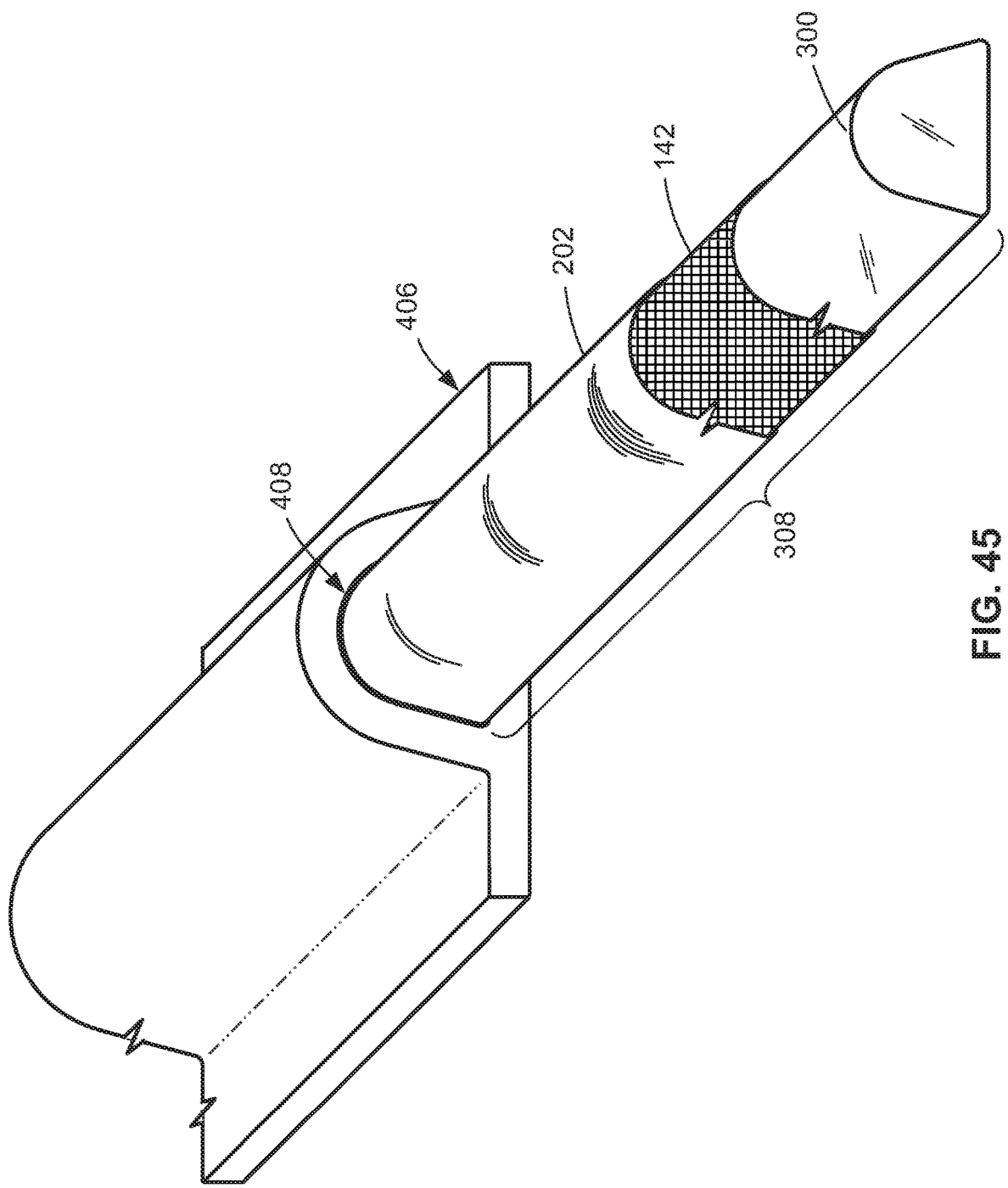
FIG. 45 is a perspective view of a portion of a composite stringer showing a film-sock-mandrel assembly protruding from a cavity of the composite stringer.

Referring now to the drawings which illustrate various examples of the disclosure, shown in FIG. 1 is a perspective view of an example of a system 100 for the automated preparation of mandrels 300 for use in the manufacturing of composite stringers 406 (e.g., FIGS. 44-45). FIG. 2 is a top view of the example of the system 100 of FIG. 1. The system 100 includes a U-shaped chute 106 having a chute inlet 108, a chute outlet 110, and a radiused portion 112 between the chute inlet 108 and chute outlet 110. The chute 106 is hollow and has a cross-sectional size and shape configured to receive and guide the mandrel 300 from the chute inlet 108 to the chute outlet 110. The system 100 additionally includes one or more feeder mechanisms 130 configured to move the mandrel 300 into and through the chute 106.

The system 100 also includes a sock application assembly 140 (FIG. 2) located proximate the chute outlet 110. The sock application assembly 140 is configured to gradually or progressively apply a breather sock 142 (FIG. 12) in tubular form over the mandrel length as the mandrel 300 exits the chute outlet 110. In addition, the system 100 includes a film application assembly 200 (FIG. 2) located proximate the chute outlet 110 and positioned downstream of the sock application assembly 140. The film application assembly 200 is configured to gradually or apply a film 202 (FIG. 26) (FIG. 2) in tubular form over the breather sock 142 as the mandrel 300 exits the sock application assembly 140, thereby forming a film-sock-mandrel assembly 308 (e.g., FIGS. 39-40). As described in greater detail below, the operation of the system 100 may be controlled by a controller or processor 104. For example, the processor 104 may control the starting, stopping, and rotational direction of the feeder mechanisms 130, and may also control the movement of the various components of the below-described sock application assembly 140 and the film application assembly 200.

The presently-disclosed system 100 may significantly reduce the amount of time and labor required to apply a breather layer and film layer to a mandrel 300, relative to the amount of time and labor associated with conventional manual methods of applying a breather layer and a film layer over a mandrel 300. In addition, the U-shaped chute 106 of the presently-disclosed system 100 reduces the amount of production floor space otherwise required in conventional manual processes of applying a breather layer and a film layer over a mandrel 300 which, in some cases, may have a mandrel length of up to 80 feet or more. The mandrel 300 may be formed of rubber, silicone, or other flexible or bendable material. The mandrel 300 may have a solid cross section as shown, or the mandrel 300 may be hollow and may include end fittings (not shown) to allow the mandrel 300 to be pressurized to facilitate the forming, consolidation and/or curing of a composite stringer 406 (e.g., FIG. 45).

As mentioned above, the mandrel 300 may be implemented for use in manufacturing a composite stringer 406 (FIGS. 44-45) for applying a breather sock 142 (FIG. 12) and a film 202 (FIG. 26) in tubular form over the mandrel 300. During the manufacturing of a composite stringer 406, the breather sock 142 (i.e., the breather layer) may facilitate airflow along the length of the mandrel 300 for evacuation of moisture, gas, and volatiles that may be released from the mandrel 300 during curing of the composite stringer 406, and thereby preventing such moisture, gas, and volatiles from entering the composite plies (not shown) surrounding the mandrel 300. The film 202 may isolate the breather sock 142 from the composite plies surrounding the mandrel 300 to thereby to prevent resin in the composite plies from adhering or bonding to the breather sock 142 during curing of the composite stringer 406. In addition, the film 202 may be non-binding to the composite plies surrounding the mandrel 300, and may thereby facilitate the removal of the mandrel 300 from the cavity 408 of the composite stringer 406 after curing is complete, as shown in FIG. 45.

Figure 3:
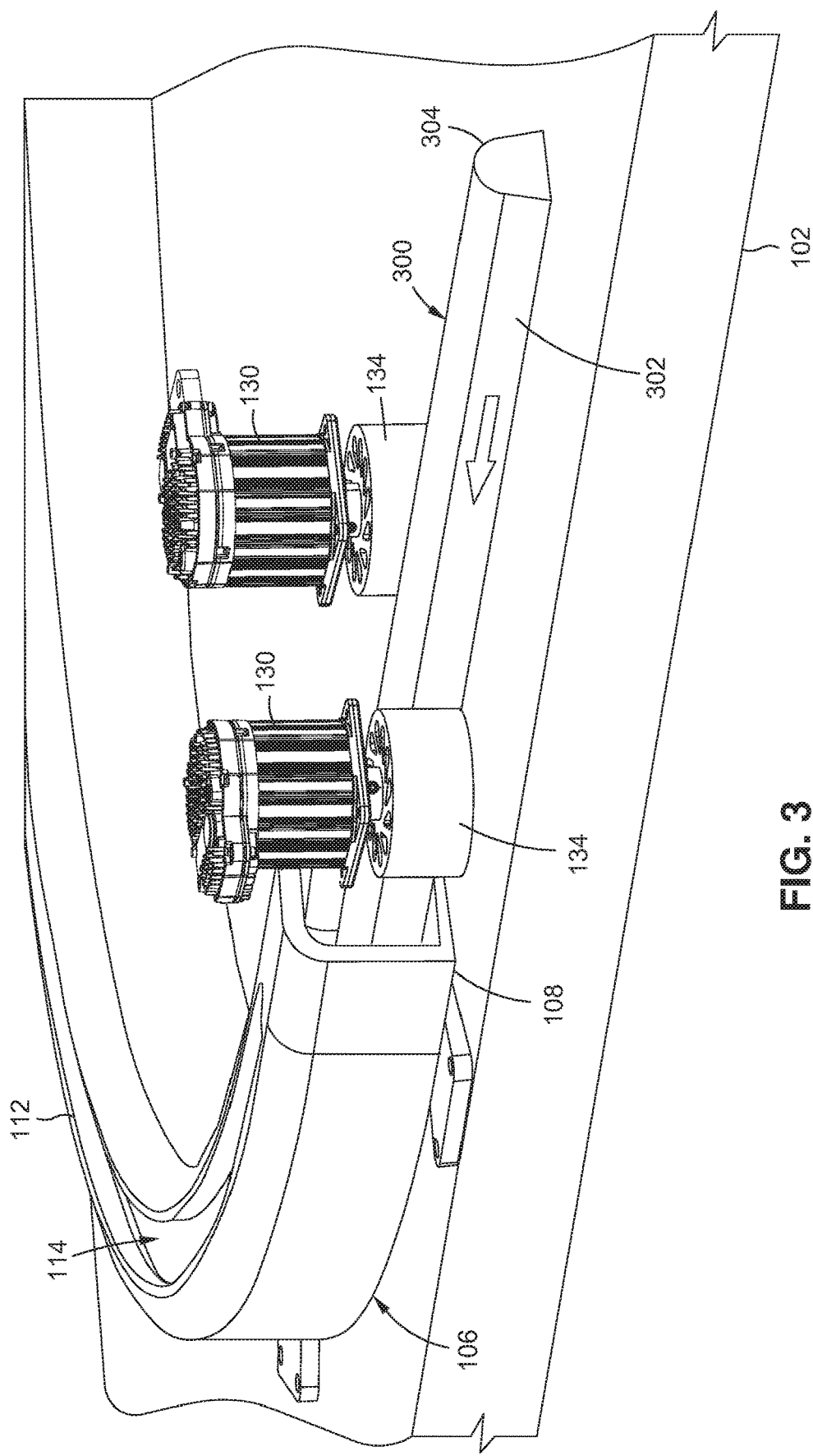
FIG. 3 is a top-down perspective view of the system taken along Line 3 of FIG. 2 and illustrating a pair of feeder mechanisms configured to move the mandrel into a chute inlet of the chute.

Referring to FIGS. 1-3, the radiused portion 112 of the chute 106 is U-shaped as mentioned above, and may be define a 180 degree arc which advantageously reduces the amount of production floor space that would otherwise be required if the chute 106 were straight from the chute inlet 108 to the chute outlet 110. The chute 106 and the components of the sock application assembly 140 and the film application assembly 200 may be supported on a table 102. The table 102 may be a continuous surface such as a metallic plate. Alternatively, the table 102 may be configured as a frame assembly (not shown) comprised of interconnected frame members to which the various components of the system 100 may be mounted.

The chute 106 has a hollow cross section of a size and shape configured to receive the mandrel 300 which has a mandrel length, mandrel side surfaces 302, and opposing mandrel ends 304. The chute cross-section may have any shape such as a square cross-sectional shape, a rectangular cross-sectional shape, or a circular cross-sectional shape. In some examples, the cross-sectional shape of the chute 106 may be complementary to the cross-sectional shape of the mandrel 300 which, in the example shown, has a flat base surface and tapered side surfaces that transition into a rounded top surface. However, the chute 106 may be configured to receive mandrels 300 having any one of a variety of alternative cross-sectional shapes (not shown), such as a semi-circular cross-sectional shape, a trapezoidal cross-section shaped, a square cross-sectional shape, or other cross-sectional shape.

The chute 106 may be manufactured from straight tube stock (e.g., square steel tubing) that is formed or bent into a U shape to form the radiused portion 112 having a desired radius of curvature. In this regard, the radius of curvature of the radiused portion 112 may be large enough to prevent binding of the mandrel 300 against the interior surfaces of the radiused portion 112 as the mandrel 300 bends while moving through the radiused portion 112. In one example, for a mandrel 300 having a mandrel width of approximately 2 inches, the radiused portion 112 may have a radius of curvature of no less that approximately 2 feet. However, the radiused portion 112 of the chute 106 may have any radius of curvature that allows for generally free movement of the mandrel 300 through the chute 106 at the urging of the feeder mechanisms 130. Although shown as having a constant radius of curvature, the radiused portion 112 may have a non-constant radius of curvature and may include one or more straight sections.

Figure 4:
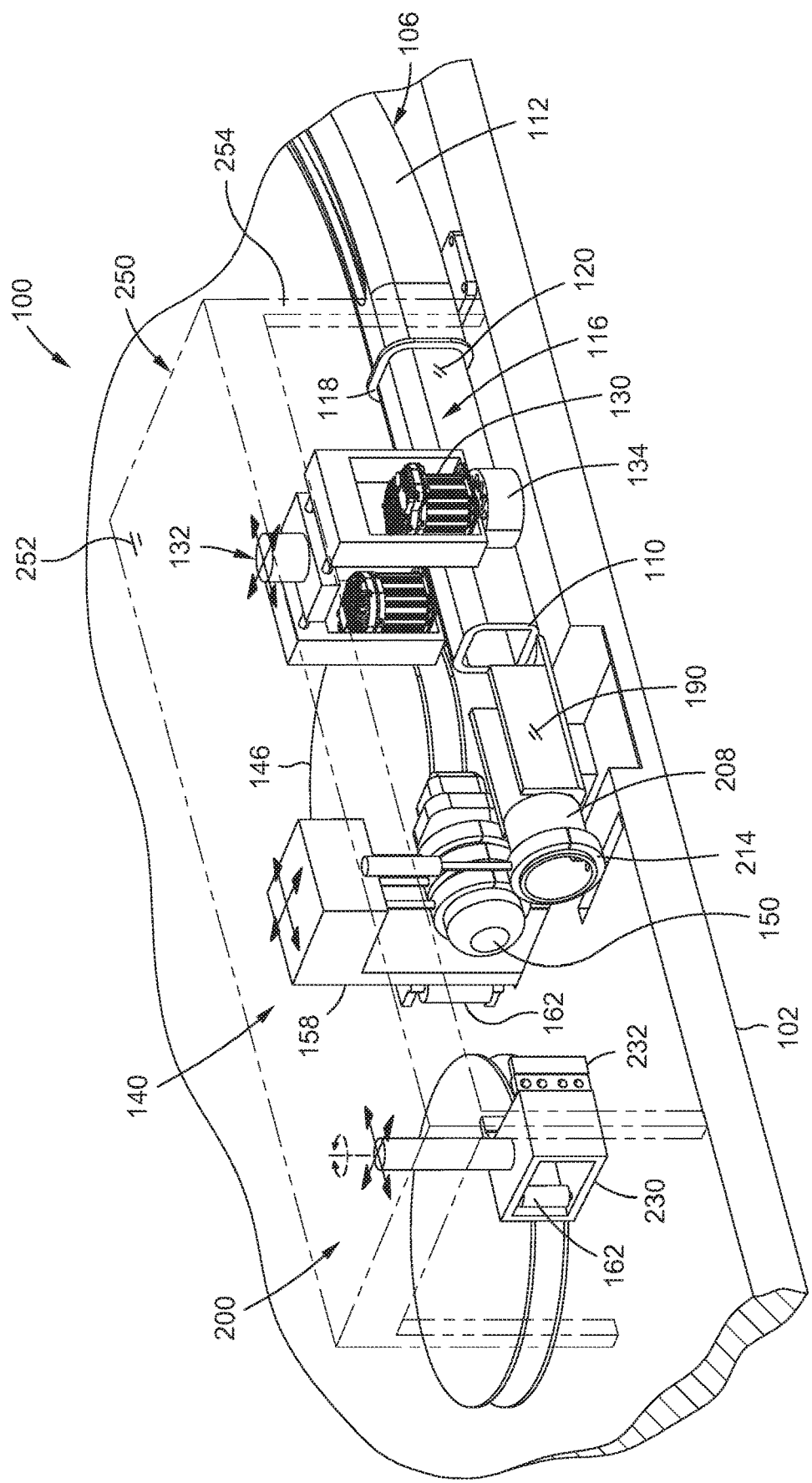
FIG. 4 is a top-down perspective view of the system taken along Line 4 of FIG. 2 and illustrating an example of a sock application assembly and an example of a film application assembly downstream of a chute outlet and respectively configured to apply a breather sock and a film over the mandrel as the mandrel exits the chute outlet.

In the example of FIGS. 1-3, the chute 106 may include a slot 114 formed in the upper side of the chute 106 to allow an operator or technician to observe the mandrel 300 moving within the chute 106. In addition, the slot 114 may allow access to the chute interior for monitoring and/or maintenance of the interior surfaces of the chute 106. The interior surfaces of the chute 106 may have a low-friction coating or a layer (e.g., Teflon™) to reduce sliding friction of the mandrel side surfaces 302. Although not shown, the chute 106 may include one or more guide rollers to facilitate movement of the mandrel 300 through the radiused portion 112. The chute inlet 108 may include a relatively short (e.g., less than 12 inches in length) straight section which may extend tangentially from the radiused portion 112. As shown in FIG. 4, the chute outlet 110 is defined by a sock reservoir 116 which may also be straight and may extend tangentially from the radiused portion 112, as described in greater detail below.

Referring to FIG. 3, shown is a portion of the system 100 at the chute inlet 108. As mentioned above, the system 100 includes a plurality of feeder mechanisms 130 configured to push or move the mandrel 300 into the chute inlet 108 and urge the mandrel 300 through the chute 106 and out of the chute outlet 110 (FIG. 2). At least some of the feeder mechanisms 130 may be located proximate the chute inlet 108 to urge the downstream end of the mandrel 300 into the chute inlet 108. The system 100 may include feeder mechanisms 130 at the chute outlet 110 (FIG. 4) for loading the breather sock 142 (FIG. 12) onto the sock reservoir 116, and to facilitate the movement of the mandrel 300 out of the chute 106 after the upstream end of the mandrel 300 has passed the feeder mechanisms 130 at the chute inlet 108.

The feeder mechanisms 130 at the chute inlet 108 may be supported by a feeder mechanism carrier 132 (FIGS. 1-2). For example, FIG. 1 shows each of the feeder mechanisms 130 at the chute inlet 108 supported by a feeder mechanism carrier 132 extending upwardly from the table 102. However, the feeder mechanisms 130 may be suspended from an overhead gantry (not shown) mounted at the chute inlet 108. In any examples of the system 100 disclosed herein, the feeder mechanisms 130 may each be comprised of an electric motor for driving a feeder roller 134. Although described and shown in the figures as electric motors, the feeder mechanisms 130 may alternatively be pneumatically driven or hydraulically driven. The feeder rollers 134 may optionally include an outer layer of material (e.g., polymeric material such as Delrin™, rubber, etc.) to better grip the mandrel side surfaces 302 for urging the mandrel 300 through the chute 106. A pair of feeder mechanisms 130 may be positionable against the opposing mandrel side surfaces 302 for bearing against the mandrel side surfaces 302 at one or more locations along the chute 106. For example, the chute inlet 108 includes a pair of feeder mechanisms 130 respectively located on opposite sides of the mandrel 300.

Although the figures show the feeder mechanisms 130 having feeder rollers 134 located on opposite sides of the mandrel 300, in other examples not shown, the system 100 may include one or more feeder mechanisms 130 in which the feeder rollers 134 are positioned to engage the bottom surface (not shown) of the mandrel 300 and/or engage the top surface of the mandrel 300. Furthermore, the feeder mechanisms 130 are not limited to being located at the chute inlet 108 and the chute outlet 110, and may be positioned at any one of a variety of locations along the path of the mandrel 300 through the system 100. As mentioned above, the system 100 may include one or more feeder mechanisms (not shown) integrated into the radiused portion 112 of the chute 106 to facilitate movement of the mandrel 300 through the radiused portion 112.

Figure 5:
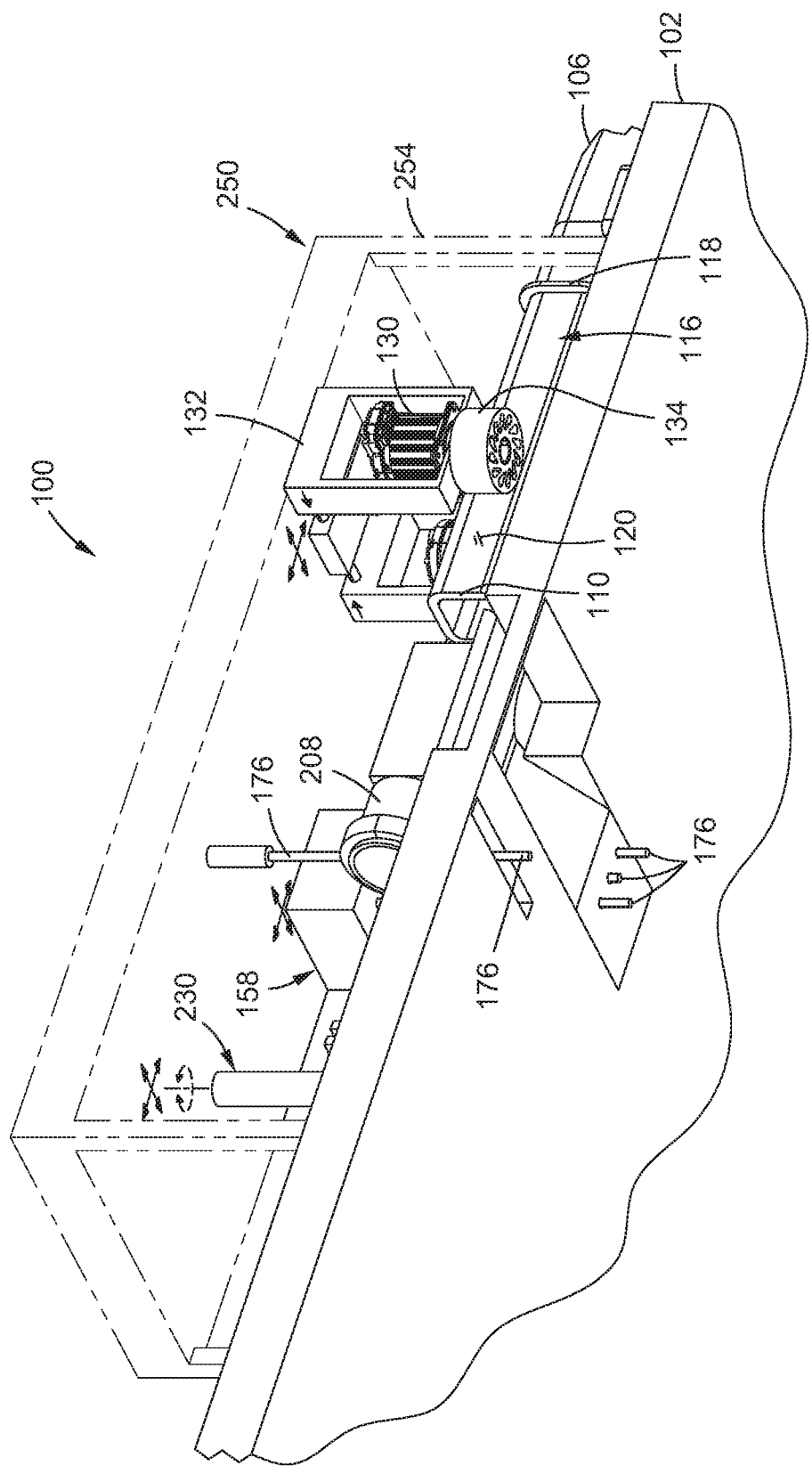
FIG. 5 is a bottom-up perspective view of the sock application assembly and film application assembly supported by an overhead gantry.

Referring to FIGS. 4-5, shown is the region of the system 100 near the chute outlet 110. A pair of feeder mechanisms 130 at the chute outlet 110 are positioned on opposite sides of the sock reservoir 116. The feeder mechanisms 130 each have a feeder roller 134 that is rotatable in opposite directions. For example, the feeder rollers 134 near the sock reservoir 116 may be rotatably driven in one direction to load the breather sock 142 (FIG. 12) onto the sock reservoir 116 as described below and shown in FIGS. 11-12, and may be rotatably driven in an opposite direction for pulling the mandrel 300 (FIGS. 1-2) out of the chute 106 and toward the film application assembly 200 as shown in FIGS. 33-35. The feeder mechanisms 130 at the chute outlet 110 are shown supported by a feeder mechanism carrier 132 (FIG. 4) that is supported by an overhead gantry 250 (FIG. 1). The gantry 250 has a gantry header 252 (FIG. 1) and a plurality of gantry legs 254 (FIG. 1) extending upwardly from the table 102 and supporting the gantry header 252. As shown in FIG. 4, the feeder mechanism carrier 132 at the chute outlet 110 may be configured to translate each feeder mechanism 130 independently along a direction perpendicular to a lengthwise direction of the sock reservoir 116, and along a direction parallel to the lengthwise direction of the sock reservoir 116.

FIGS. 4-5 also show the sock application assembly 140 and the film application assembly 200 located proximate the chute outlet 110. The components of the sock application assembly 140 and the components of the film application assembly 200 may be supported by the gantry 250. However, in other examples not shown, the sock application assembly 140 and/or the film application assembly 200 may be supported by other means such as by dedicated fixtures (not shown) extending upwardly from the table 102. In still further examples not shown, any one or more of the components of the system 100 including the feeder mechanisms 130, the components of the sock application assembly 140 and/or the components of the film application assembly 200 may be supported by one or more robotic devices.

Figure 6:
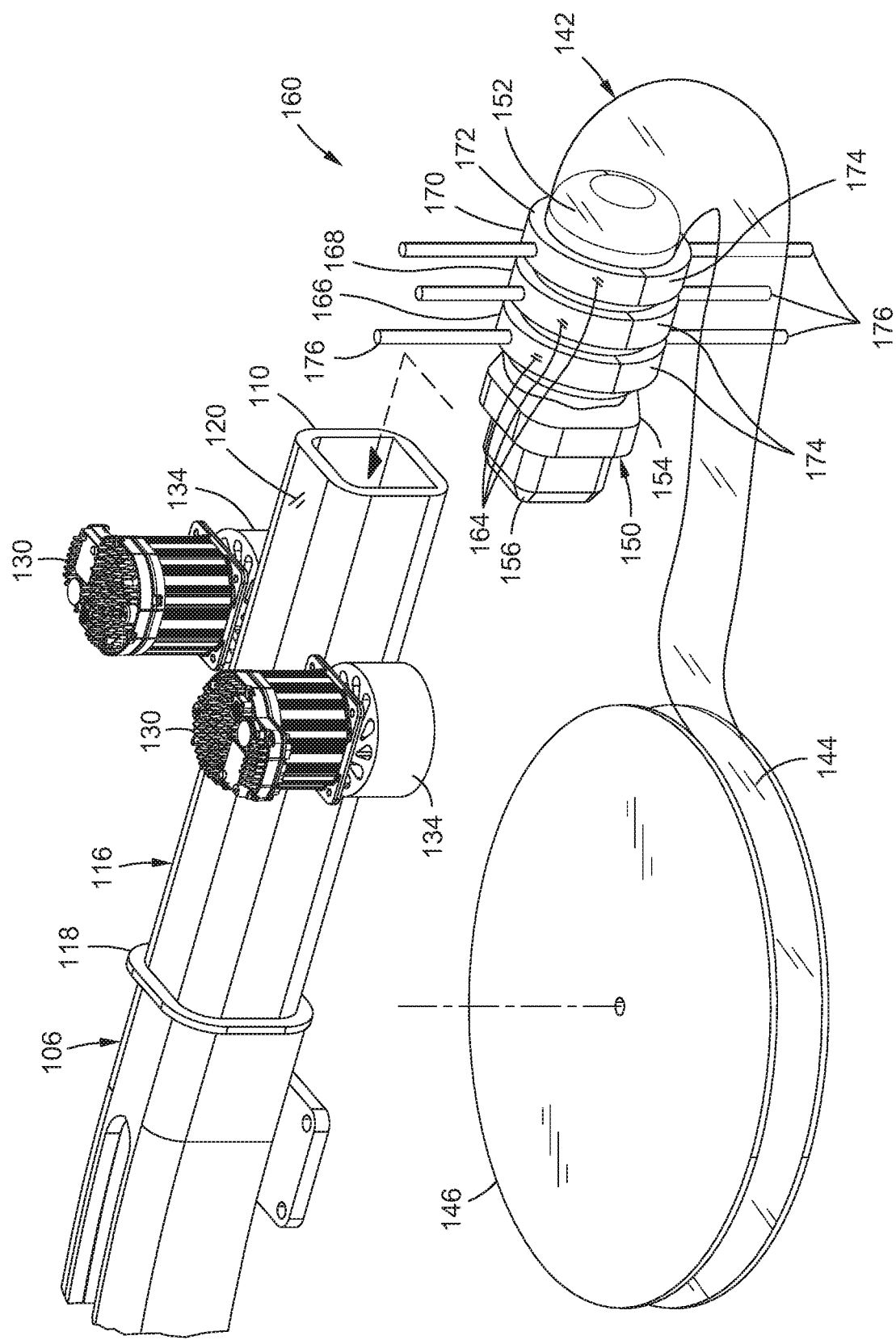
FIG. 6 is a perspective view of an example of a sock baton having a plurality of baton ring clamps for clamping the breather sock onto the baton outer surface prior to engagement of the sock baton into the chute outlet.

Referring to FIGS. 4-6, as mentioned above, the sock application assembly 140 is configured to apply a breather sock 142 (FIG. 12) in tubular form over the mandrel length as the mandrel 300 exits the chute outlet 110. As noted above, the system 100 includes the sock reservoir 116 which may comprise a lengthwise section of the chute 106 and which defines the chute outlet 110. The sock reservoir 116 has a reservoir outer surface 120, and may be configured as a straight section of tubing that is integral with the chute 106 and may extend tangentially from the radiused portion 112. However, in other examples not shown, at least a portion of the sock reservoir 116 may be non-straight and may comprise or include a section of the radiused portion 112.

Figure 12:
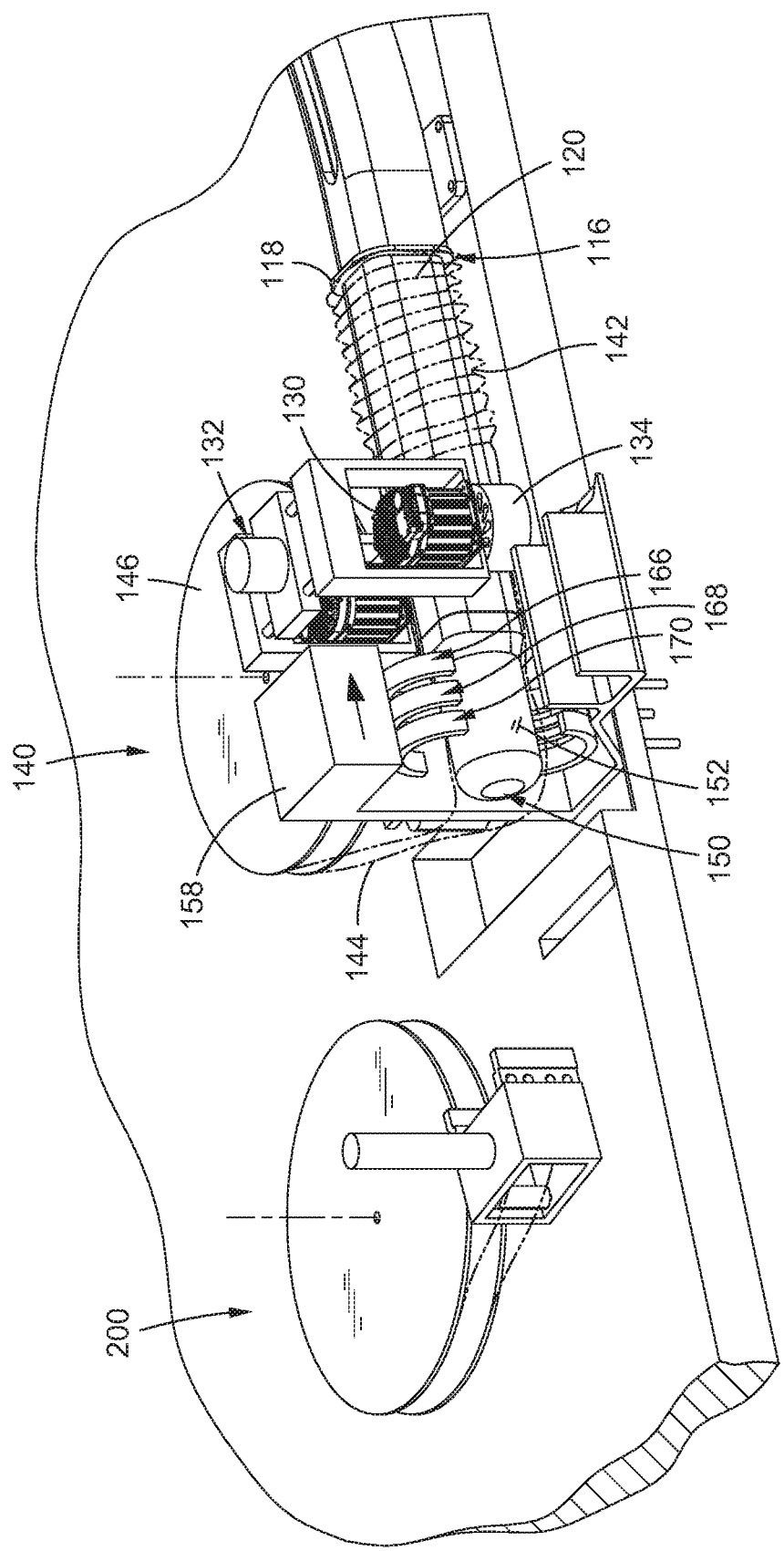
FIG. 12 shows the breather sock gathered on the sock reservoir by the feeder mechanisms, and further shows the baton carrier translating the baton ring clamps back over the baton outer surface.

The sock reservoir 116 may have a sock backstop 118 located at a spaced distance from the chute outlet 110. For example, the sock reservoir 116 may have a length of up to several feet or more between the chute outlet 110 and the sock backstop 118. The length of the sock reservoir 116 may be dependent upon the sock length to be loaded in a gathered arrangement on the sock reservoir 116 (FIG. 12). The sock backstop 118 may be a flange that protrudes radially outwardly from the reservoir outer surface 120 of the sock reservoir 116. The sock backstop 118 may provide an element against which the breather sock 142 may be butted as the breather sock 142 is loaded in a gathered arrangement onto the reservoir outer surface 120. The sock reservoir 116 may have a length that accommodates a gathered arrangement of sock length that, when fully extended in a lengthwise direction, is at least as long as the mandrel length. The sock reservoir 116 may have a cross-sectional shape and cross-sectional size that is complementary to the cross-sectional shape and/or cross-sectional size of the radiused portion 112.

The sock application assembly 140 includes a sock material spool 146 (FIG. 6) which may be supported by the table 102 (FIG. 4) and located proximate the sock reservoir 116. The sock material spool 146 may contain a continuous length of sock material 144 in flattened tubular form and which may be wound onto the sock material spool 146. The sock material 144 of the breather sock 142 may be relatively thin (e.g., less than 0.100 inch thick) and may be comprised of natural (e.g., cotton, wool, linen, etc.) or synthetic fibers (e.g., polyester, Nylon™, Rayon™, etc.) that may be woven or non-woven, knitted, or otherwise intertwined (e.g., felt) or interconnected in a manner allowing the sock material 144 to radially expand when being pulled over the mandrel 300 (FIGS. 1-2).

The breather sock 142 has a closed cross section and may have a smaller diameter than the mandrel width when the breather sock 142 is in a non-radially-expanded state, such as prior to being drawn onto the sock reservoir 116. The sock material 144 may be woven or configured in a manner causing the breather sock 142 to tighten (FIGS. 33-34)

against the mandrel side surfaces 302 as the breather sock 142 is being pulled over the mandrel 300, and which may reduce or avoid the occurrence of wrinkles in the sock material 144, which may undesirably locally increase the thickness of the breather sock 142 against the mandrel side surfaces 302.

Figure 7:
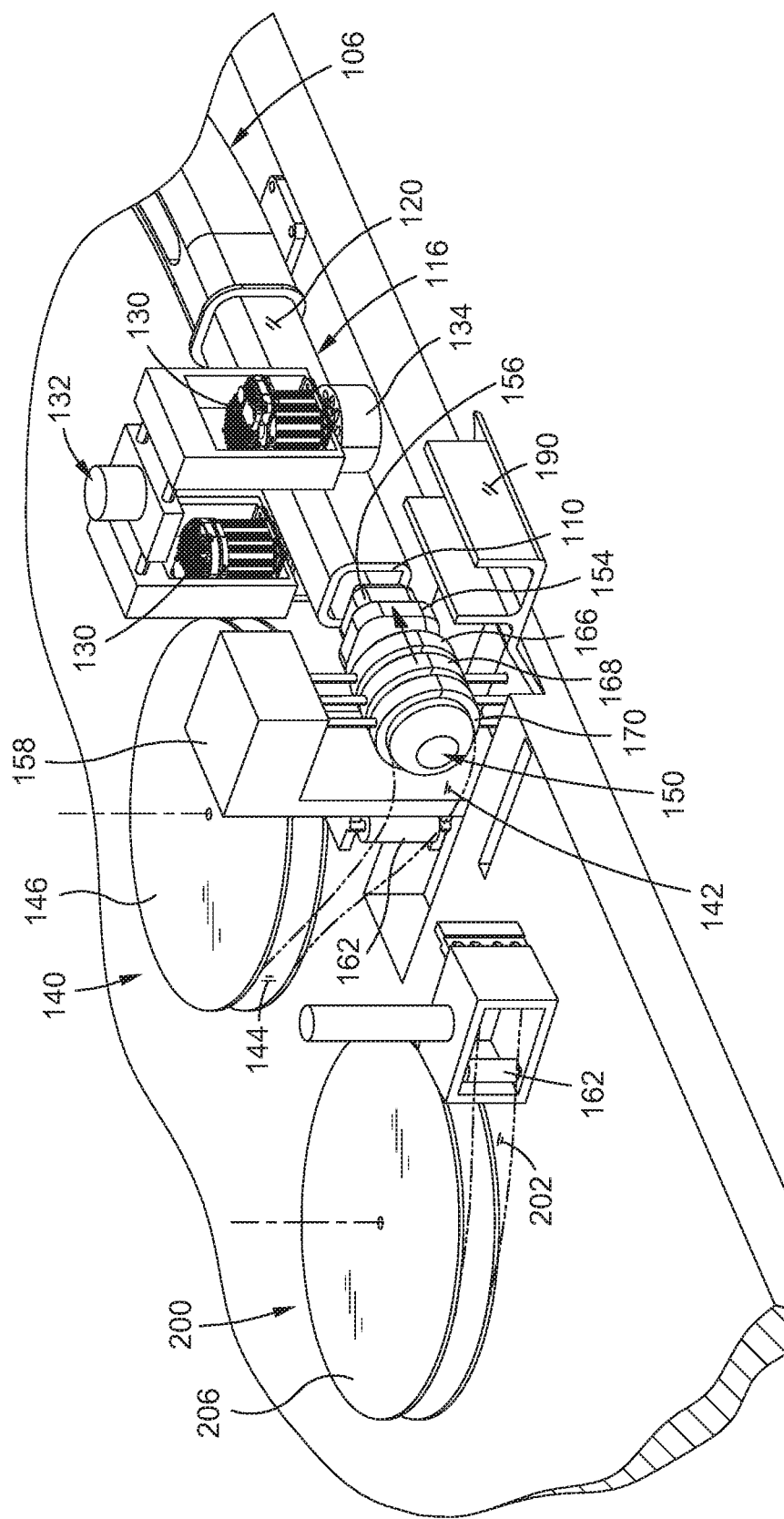
FIG. 7 is a perspective view of the sock baton supported by a plurality of baton ring clamps which are carried by a baton carrier that may be supported by the gantry.
Figure 8:
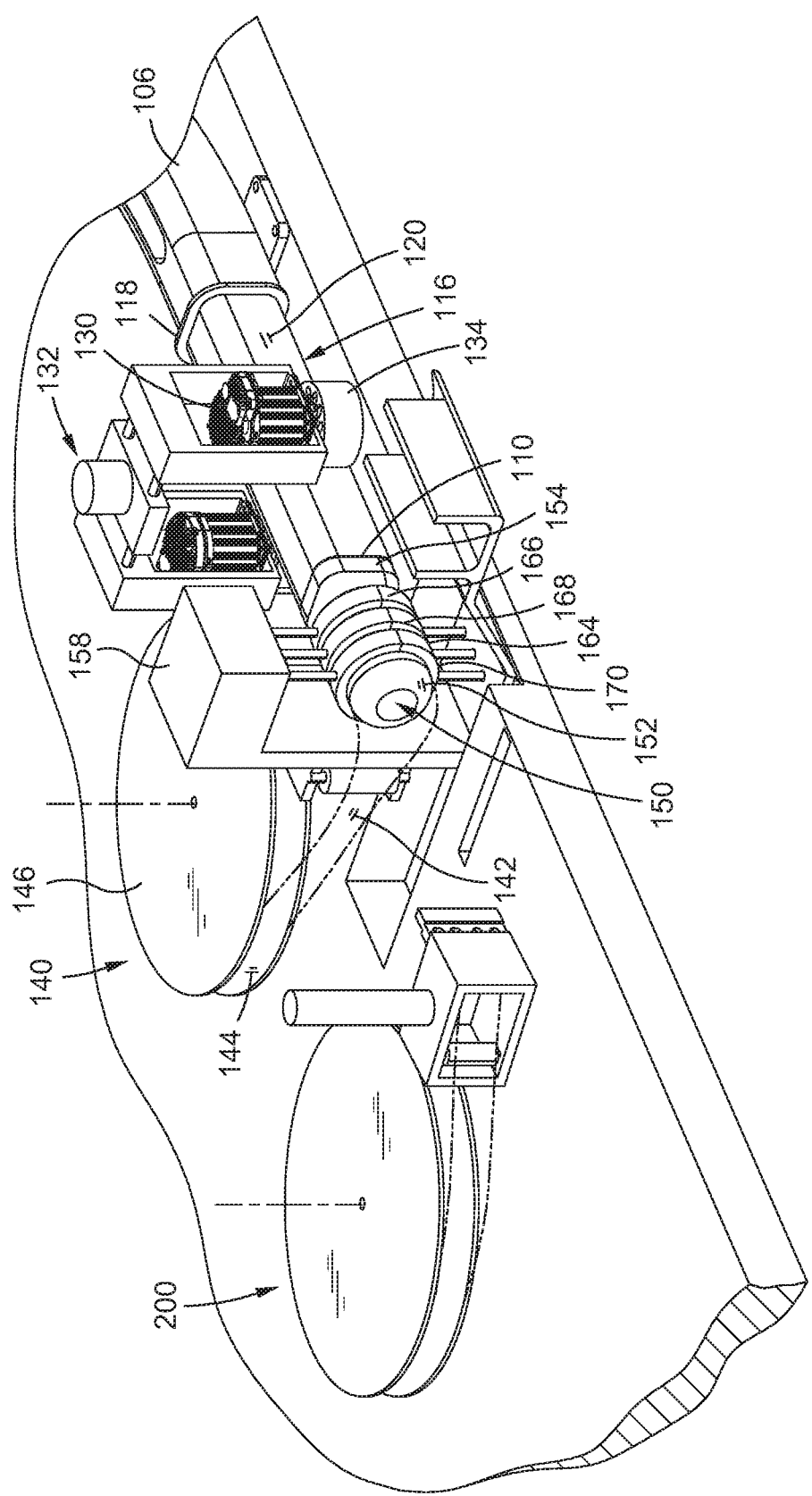
FIG. 8 shows the baton carrier after moving the sock baton into engagement with the chute outlet, and further showing a pair of feeder mechanisms located on opposing sides of a sock reservoir.

Referring to FIGS. 6-10, the sock application assembly 140 includes a sock baton 150 which has a baton outer surface 152. Initially, prior to preparing the first in a series of mandrels 300 (FIGS. 1-2), a relatively short length of sock material 144 may be manually applied over the sock baton 150 (e.g., by a technician) while the baton ring clamps 164 are temporarily separated away from the baton outer surface 152, after which the sock application assembly 140 may operate autonomously (e.g., without human intervention) in applying breather sock 142 to a plurality of mandrels 300 passed in succession through the chute 106. With the sock material 144 clamped to the sock baton 150 (FIG. 6), the sock baton 150 may be translated into alignment with the sock reservoir 116 as shown in FIG. 7, and engaged with the chute outlet 110 as shown in FIGS. 7-8. The sock baton 150 may include a plug portion 156 (FIG. 6) located on an upstream end of the sock baton 150. The plug portion 156 may have a length of up to several inches and a cross-sectional size and shape configured to snugly fit within the cross-sectional shape and size of the chute outlet 110. The plug portion 156 is configured to allow the sock baton 150 to be removably coupled to the chute outlet 110 to allow the breather sock 142 to be axially slid onto the sock reservoir 116. As shown in FIG. 7, the plug portion 156 may be axially inserted into the chute outlet 110 as a means for coupling the sock baton 150 to the sock reservoir 116. The downstream end of the sock baton 150 may be generally rounded (e.g., FIG. 6) to facilitate the movement of the breather sock 142 over the sock baton 150 and onto the sock reservoir 116, as described below.

The baton outer surface 152 may be cylindrically shaped. However, in an example not shown, the baton outer surface 152 may be non-cylindrical, and may be sized and shaped complementary to the cross sectional shape of the sock reservoir 116. As shown in FIGS. 6-7, the sock baton 150 may include a baton-reservoir transition portion 154 having a cross-sectional shape that transitions from the cross-sectional shape (e.g., square) of the reservoir outer surface 120, to the cross-sectional shape (e.g., circular) of the baton outer surface 152.

Referring to FIGS. 6-10, the sock application assembly 140 includes a baton clamp assembly 160 (FIG. 6) and a baton carrier 158. The baton carrier 158 is configured to support and translate the baton clamp assembly 160 (FIG. 6), which is clampable around the sock baton 150 and which also provide a means for translating the sock baton 150. In this regard, the sock baton 150 is an independent component that is not permanently connected to any other component, and is instead handed off between the baton clamp assembly 160 and the sock reservoir 116 during the below-described operations of loading the breather sock 142 onto the sock reservoir 116, as shown in the figures.

The baton carrier 158 may be supported by the gantry 250 (FIGS. 4-5) or by other support means (e.g., a table-mounted fixture, a robotic device—not shown). In the example shown, the baton carrier 158 is configured as a C-shaped bracket. However, the baton carrier 158 made provided in any one of a variety of alternative configurations. The baton carrier 158 may include one or more carrier actuators (not shown) configured to provide at least two degrees of freedom for movement of the baton clamp assembly 160. For example, the carrier actuators may be two-axis actuators configured to translate the baton carrier 158 along a longitudinal direction (i.e., parallel to the lengthwise direction of the sock reservoir 116—FIGS. 7-8) and along a lateral direction (i.e., perpendicular to the lengthwise direction of the sock reservoir 116—FIGS. 15-16).

The baton carrier 158 may position, via the baton clamp assembly 160, the sock baton 150 into engagement with the chute outlet 110 (e.g., FIGS. 7-10) prior to the loading of a predetermined length of sock material 144 onto the sock reservoir 116 (e.g., FIGS. 11-14). The baton carrier 158 may also disengage, via the baton clamp assembly 160, the sock baton 150 from the chute outlet 110 after the breather sock 142 has been loaded onto the sock reservoir 116 (e.g., FIGS. 15-16). Furthermore, the baton carrier 158 may laterally translate the sock baton 150 out of alignment with the sock reservoir 116 (FIG. 16) while simultaneously translating a ramp 190 into alignment with the sock reservoir 116 to enable the ramp 190 to support the section of the mandrel 300 extending between the chute outlet 110 and the film collar 208. The baton carrier 158 may include one or more guide rollers 162 for guiding the sock material 144 from the sock material spool 146 onto the sock baton 150. The guide rollers 162 on the baton carrier 158 may prevent abrading or snagging of the sock material 144 on sharp edges (not shown) as the sock material 144 is drawn from the sock material spool 146 during loading of the breather sock 142 onto the sock reservoir 116.

Referring to FIGS. 6-16, the baton clamp assembly 160 includes at least one baton ring clamp 164 (FIG. 6) configured to clamp the breather sock 142 to the baton outer surface 152 (FIG. 6). Each baton ring clamp 164 may have a clamp inner cross-sectional shape that is complementary to the cross-sectional shape of the baton outer surface 152. The baton ring clamps 164 are configured to be alternately coupled and decoupled from the baton outer surface 152. For example, the baton ring clamps 164 may be actuated by one or more clamp actuators (not shown) for clamping the breather sock 142 against the baton outer surface 152 during translation of the sock baton 150 into engagement with the chute outlet 110 as shown in FIGS. 7-8. In addition, the clamp actuators may be actuated to decouple the baton ring clamps 164 away from the baton outer surface 152 to allow a predetermined length of the sock material 144 to be pulled, via the feeder mechanisms 130 at the chute outlet 110, over the sock baton 150 and accumulated in a gathered arrangement on the reservoir outer surface 120 of the sock reservoir 116, as shown in FIGS. 9-12.

Figure 9:
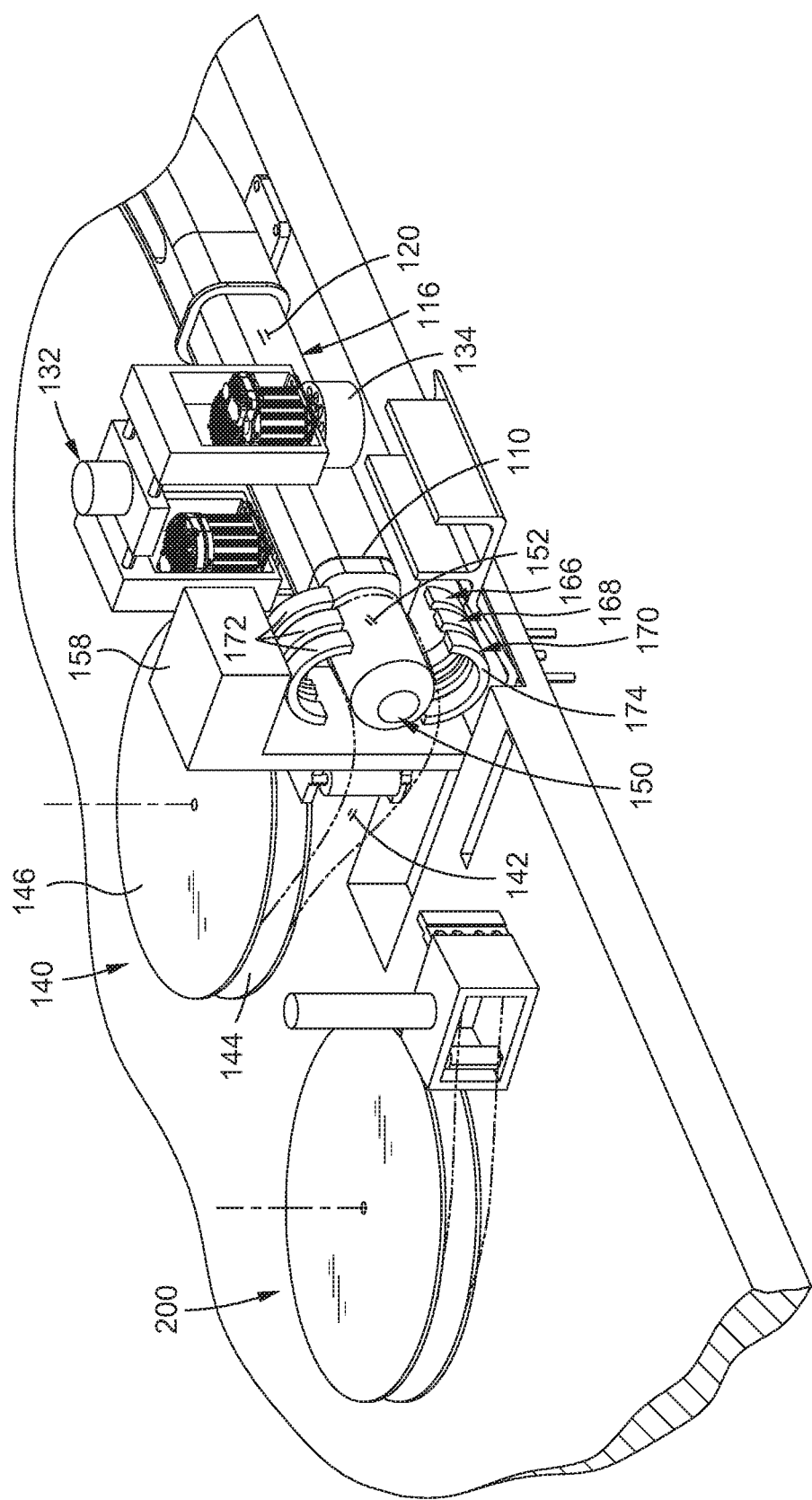
FIG. 9 shows the baton carrier after the baton ring clamps have been decoupled from the baton outer surface to allow the breather sock to be pulled over the sock baton.

As shown in FIGS. 6-14, the baton clamp assembly 160 (FIG. 6) includes an upstream baton ring clamp 166 (FIG. 6), a center baton ring clamp 168 (FIG. 6), and a downstream baton ring clamp 170 (FIG. 6). In the example shown, each baton ring clamp 166, 168, 170 may be comprised of a baton upper clamp half 172 (FIG. 6) and a baton lower clamp half 174 (FIG. 6) respectively actuated by an upper clamp actuator (not shown) and a lower clamp actuator (not shown). The inner surface of the baton upper clamp half 172 and the baton lower clamp half 174 may each have a semi-circular shape and may additionally include a post 176 (FIG. 6) extending radially outwardly from each clamp half 172, 174. Each clamp actuator may be coupled to a post 176 for respectively for moving the baton upper and lower clamp halves 172, 174 of each baton ring clamp 166, 168, 170 up and down as shown in FIGS. 8-9. For example, each clamp actuator may be operable for moving the respective baton upper and lower clamp halves 172, 174 onto the baton outer surface 152 for clamping the breather sock 142 to the sock baton 150, and for moving the baton upper and lower clamp halves 172, 174 away from the baton outer surface 152 to allow the breather sock 142 to be pulled over the sock baton 150 and onto the sock reservoir 116 by the feeder mechanisms 130.

Figure 10:
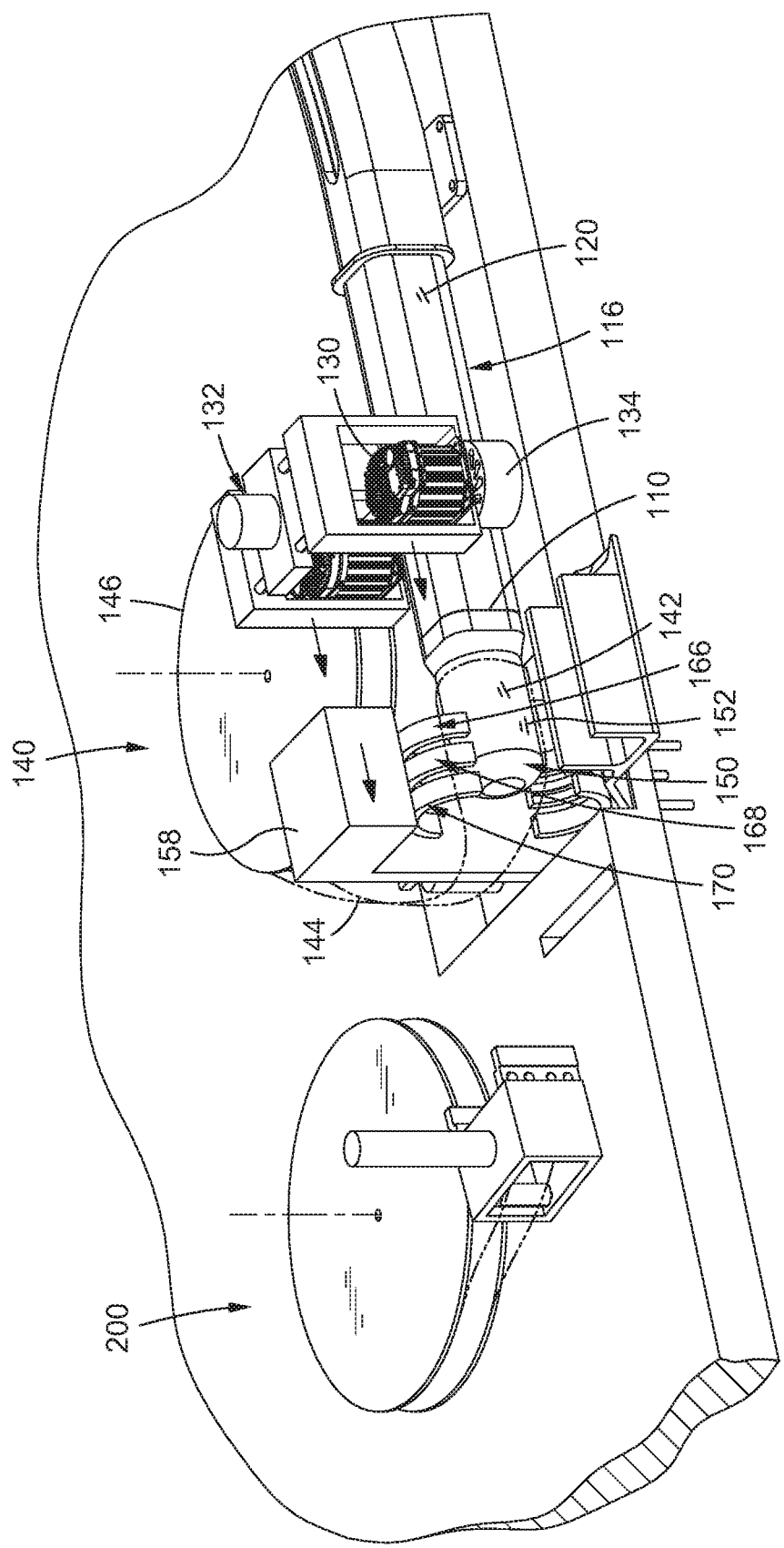
FIG. 10 shows the baton carrier translating the baton ring clamps away from the sock baton to provide clearance for a pair of feeder mechanisms to engage the breather sock on the baton outer surface.
Figure 11:
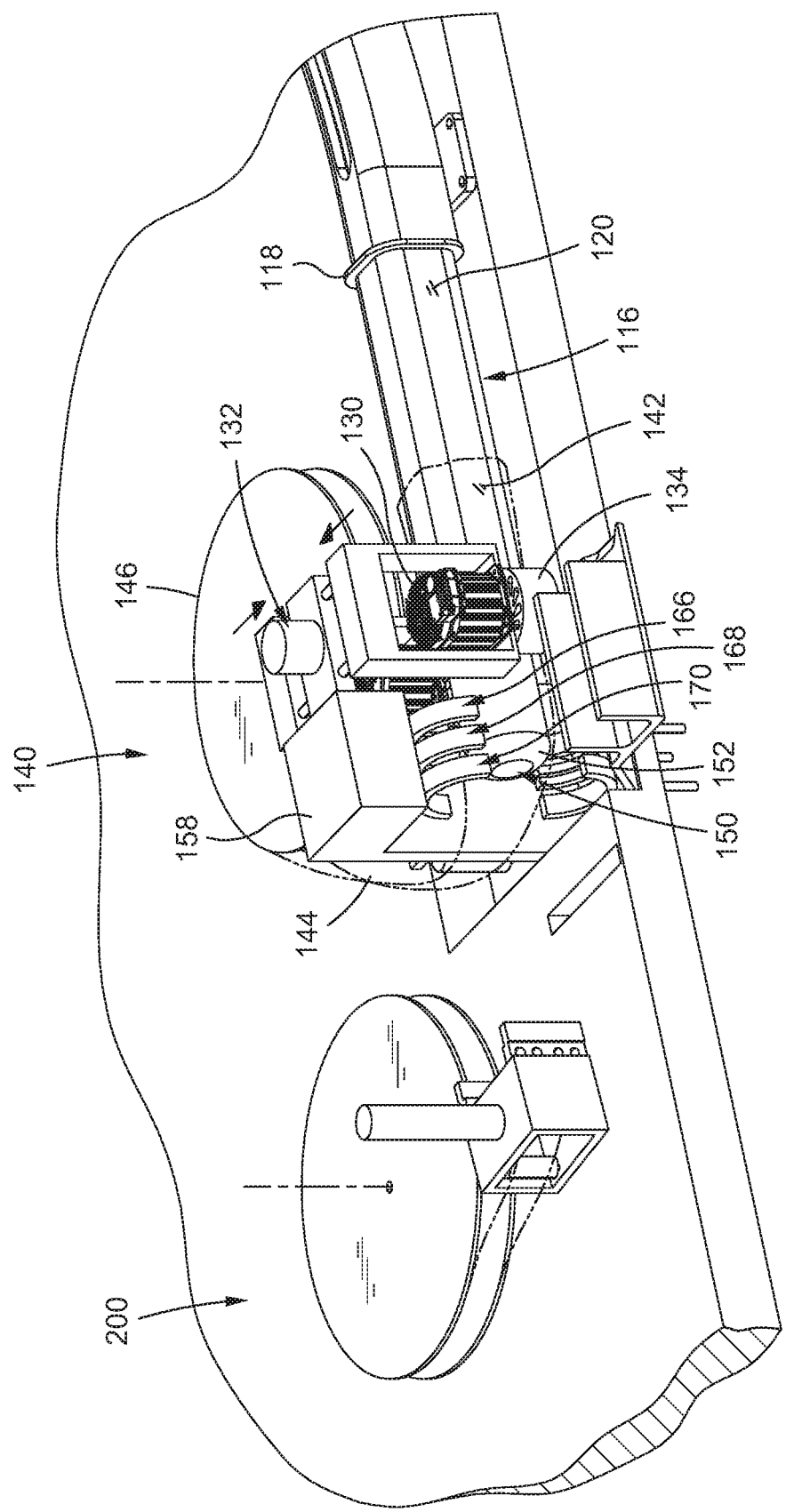
FIG. 11 shows the feeder mechanisms engaging the breather sock at the sock baton for pulling the breather sock from the sock material spool, over the sock baton, and onto the sock reservoir.

Referring to FIGS. 10-11, shown are the baton ring clamps 166, 168, 170 translated in a longitudinal direction by the baton carrier 158 to a location a short distance downstream from the sock baton 150, as shown in FIG. 10. In addition, the feeder mechanisms 130 are translated by the feeder mechanism carrier 132 in a longitudinal direction from the sock reservoir 116 to the sock baton 150 (e.g., FIG. 10). Each feeder mechanism 130 may also be independently translated by the feeder mechanism carrier 132 in a lateral direction until the feeder rollers 134 on each side of the chute outlet 110 are positioned against the breather sock 142 covering the baton outer surface 152 (e.g., FIG. 11). FIG. 12 shows the feeder mechanisms 130 translated in a longitudinal direction back toward the sock reservoir 116 for pulling the breather material from the sock baton 150 onto the reservoir outer surface 120.

With the feeder mechanisms 130 translated back over the reservoir outer surface 120, the feeder rollers 134 may be rotatably driven in a direction that draws the sock material 144 from the sock material spool 146 and over the sock baton 150 and onto the reservoir outer surface 120. Once the upstream end of the breather sock 142 abuts the sock backstop 118, the breather sock 142 accumulates in a gathered arrangement on the sock reservoir 116 as shown in FIG. 12. The length of the breather sock 142 drawn from the sock material spool 146 and accumulating on the sock reservoir 116 may be tracked such that the rotation of the feeder rollers 134 may be stopped once the sock length on the sock reservoir 116 is complementary to or slightly longer than the mandrel length. The length of the sock material 144 drawn from the sock material spool 146 may be tracked using a rotary encoder (not shown). In another example, the length of sock material 144 accumulated on the sock reservoir 116 may be tracked using rotary encoders (not shown) that may be respectively included with the feeder mechanisms 130. However, the length of breather sock 142 that is loaded onto the sock reservoir 116 may be tracked by any one of a variety of length measurement systems, and is not limited to rotary encoders.

Figure 13:
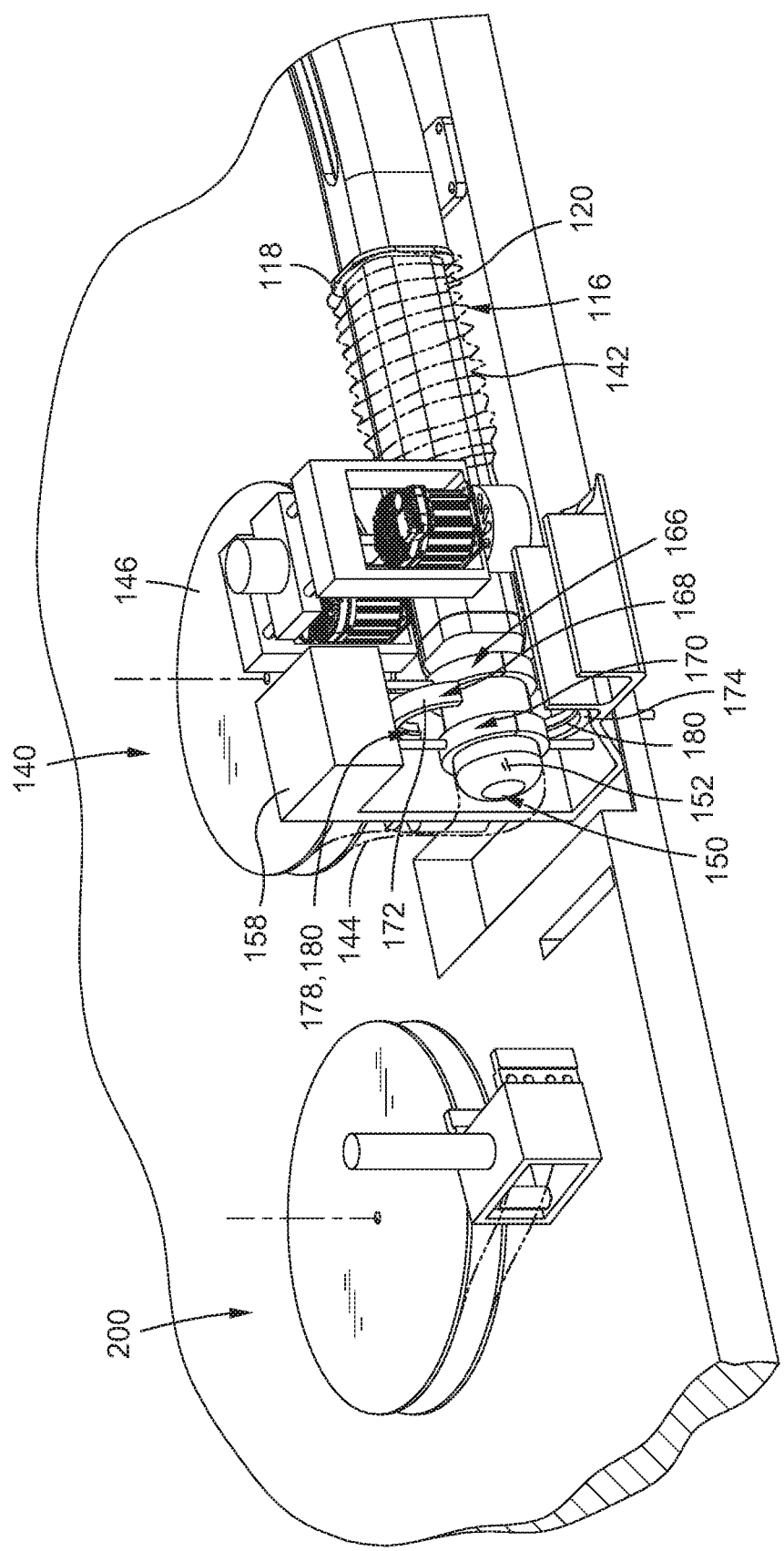
FIG. 13 shows two (2) of the baton ring clamps clamping the breather material onto the baton outer surface.
Figure 14:
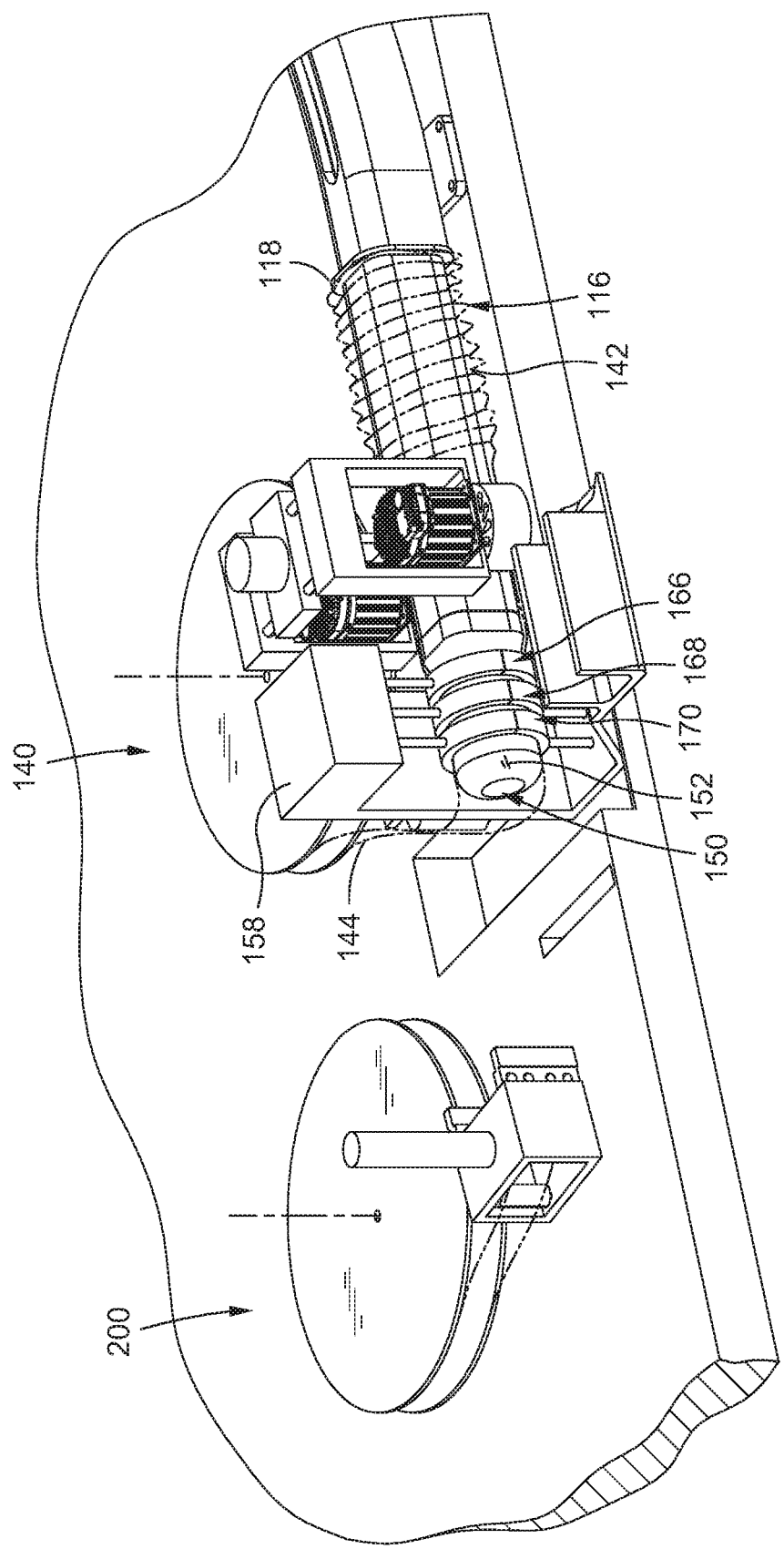
FIG. 14 shows a center baton ring clamp cutting the breather sock against the baton outer surface.

Referring briefly to FIGS. 13-14, the sock application assembly 140 may include a sock cutting device 178 configured to cut the breather sock 142 after a predetermined sock length of the breather sock 142 has been loaded in gathered arrangement onto the sock reservoir 116. In the example shown, the center baton ring clamp 168 may be configured as the sock cutting device 178. In this regard, the baton upper clamp half 172 and the baton lower clamp half 174 of the center baton ring clamp 168 may each include a radially inwardly protruding baton clamp blade portion 180. Each baton clamp blade portion 180 may be formed of a high-hardness material such as steel. The clamp actuator of each of the baton upper and lower clamp half 172, 174 may urge the baton clamp blade portion 180 of each clamp half 172, 174 against the baton outer surface 152 for cutting the breather sock 142 while the upstream baton ring clamp 166 and downstream baton ring clamp 170 hold the breather sock 142 in position against the baton outer surface 152. In order to extend the cutting life of the baton clamp blade portions 180 of the center baton ring clamp 168, the baton outer surface 152 may be formed of a compliant material to prevent dulling of the baton clamp blade portions 180. For example, the sock baton 150 and/or the baton outer surface 152 may be formed of rubber (e.g., Delrin™), rigid foam, or other compliant material. In some examples, the sock baton 150 may be configured to be disposable and may be replaced on a periodic basis after a certain number of cuts of the breather sock 142 have been made.

Figure 15:
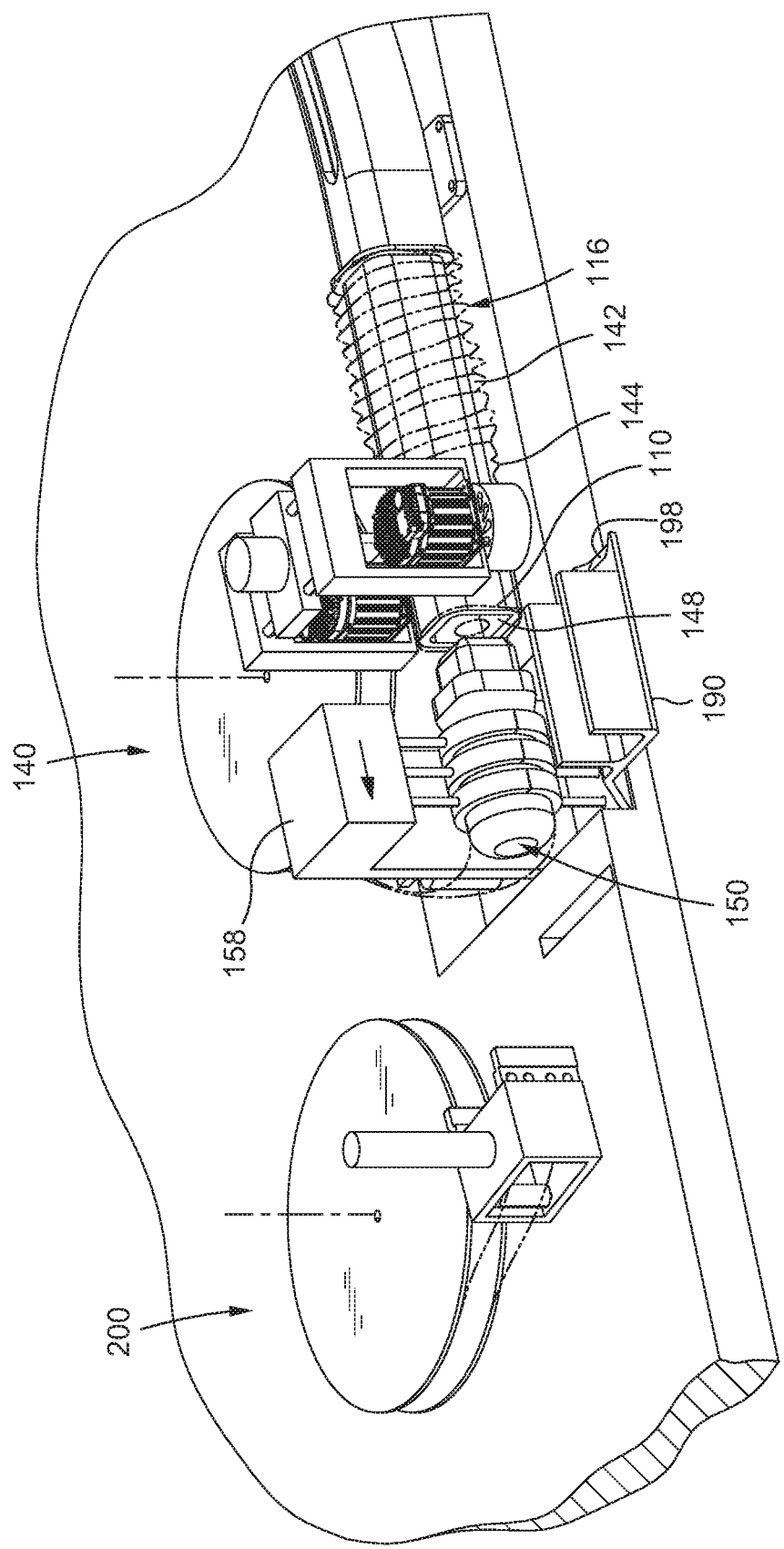
FIG. 15 shows the baton carrier translating the sock baton away from the chute end.
Figure 16:
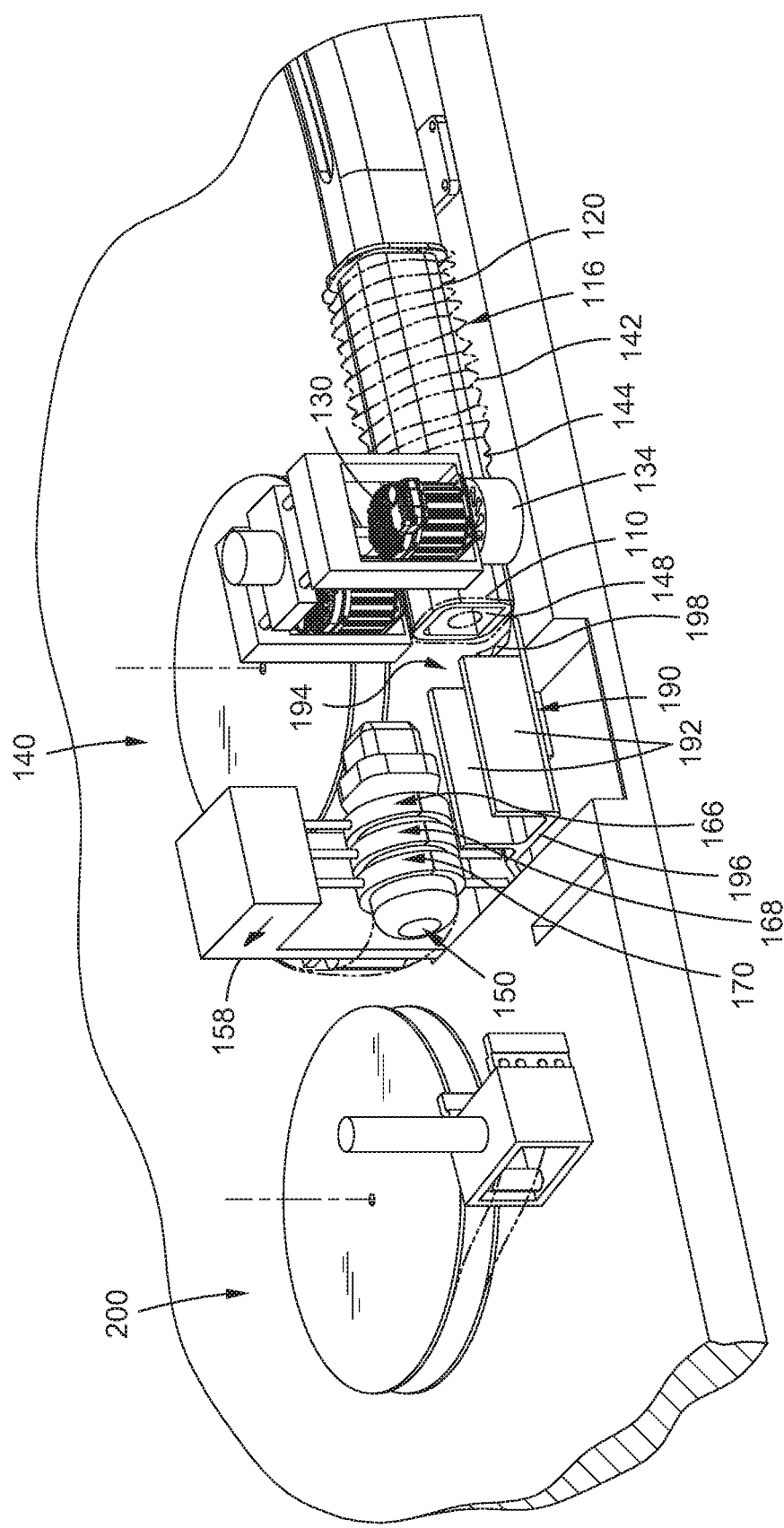
FIG. 16 shows the baton carrier laterally translating the baton clamp assembly and the sock baton out of alignment with the chute outlet, and simultaneously laterally translating a ramp into alignment with the chute outlet.

Referring to FIGS. 15-16, after the breather sock 142 has been cut, the upstream baton ring clamp 166 temporarily disengages (not shown) from the baton outer surface 152 to unclamp the downstream end of the breather sock 142 while the baton carrier 158 translates the sock baton 150 along a downstream direction for disengaging the sock baton 150 from the chute outlet 110 as shown in FIG. 15. The baton carrier 158 may then laterally translate the sock baton 150 out of alignment with the sock reservoir 116 while simultaneously translating the ramp 190 into alignment with the sock reservoir 116 as shown in FIG. 16. As the sock baton 150 is axially translated in a downstream direction away from the chute outlet 110 as shown in FIG. 15, the portion of the breather sock 142 formerly clamped (e.g., FIGS. 13 and 32) by the upstream baton ring clamp 166 slips off of the sock baton 150, and forms a sock overhang 148 (e.g., FIG. 15) which may be described as a short length of sock material 144 extending beyond or overhanging the edge of the chute outlet 110. As mentioned above, the diameter of the breather material in its natural, unexpanded state may be smaller than the width of the mandrel 300 (FIGS. 1-2), and which results in the sock overhang 148 being stretched across the opening of the chute outlet 110 as shown in FIGS. 15, 16 and 32.

Referring to FIG. 16, shown is the ramp 190 translated into alignment with the sock reservoir 116. The ramp 190 may include a pair of a ramp side walls 192 interconnected by a ramp floor 196. The ramp 190 may have a cross-sectional size that is complementary to the width of the mandrel 300. The ramp 190 may have a length that is substantially equal to or slightly less than the distance between the chute outlet 110 and the upstream end of the film collar 208. The ramp 190 may be supported by or integrated with the baton carrier 158, and may be configured such that when the sock baton 150 is laterally translated out of alignment with the sock reservoir 116, the ramp 190 is simultaneously translated into alignment with the sock reservoir 116. The ramp 190 may have a ramp leading edge 198 proximate the chute outlet 110. The ramp leading edge 198 may be tapered to prevent the sock-covered mandrel 300 (i.e., the sock-mandrel assembly 306—FIG. 33) from snagging on the ramp leading edge 198 as the mandrel 300 exits the chute outlet 110. The ramp side walls 192 at the ramp leading edge 198 may each having a ramp cutout 194 sized and configured to accommodate a feeder roller 134 of the pair of feeder mechanisms 130 positionable on opposite sides of the ramp 190.

Figure 17:
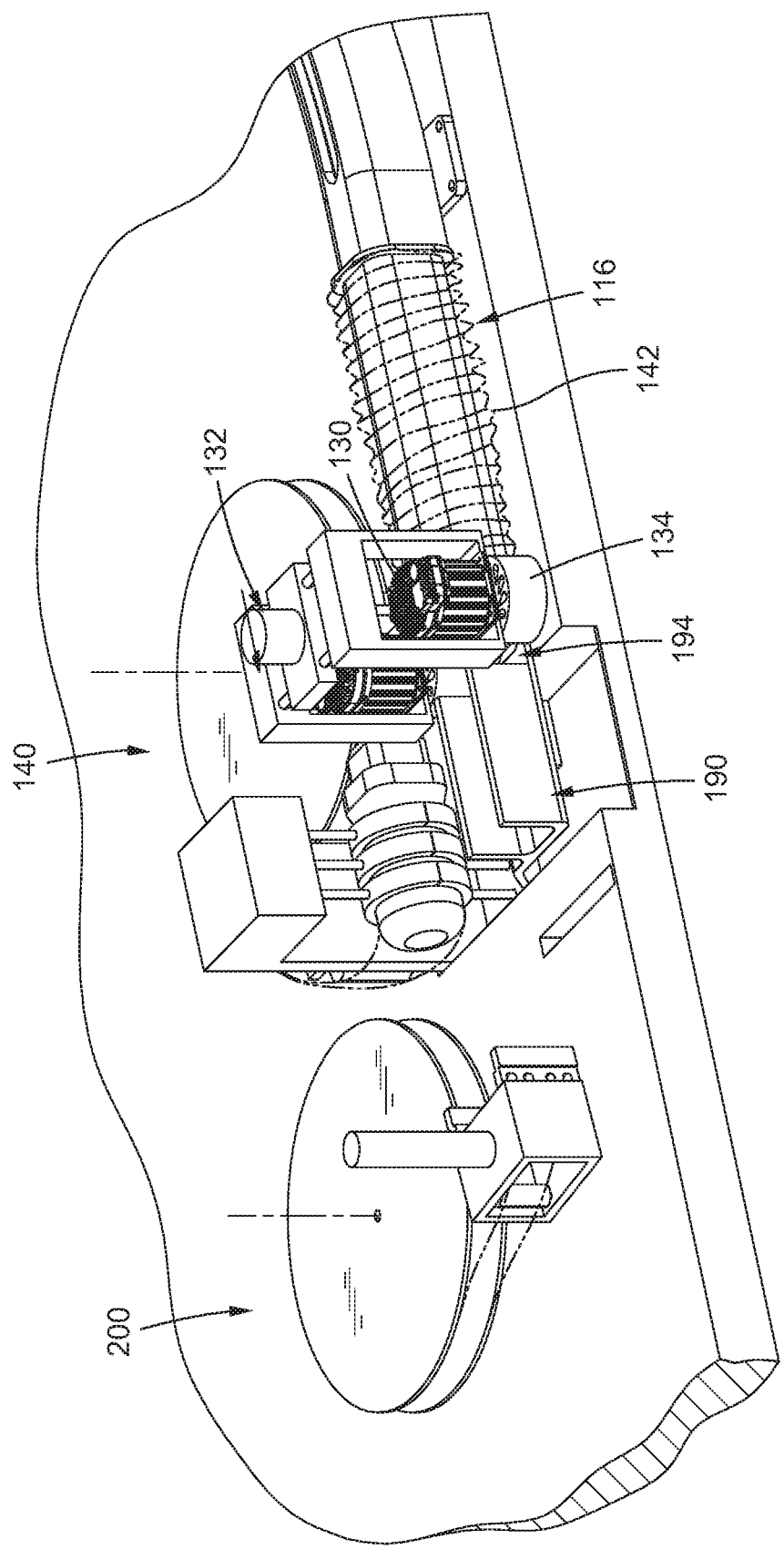
FIG. 17 shows the feeder mechanisms translated into position adjacent the chute outlet for engaging the mandrel as it exits the chute.

As shown in FIG. 17, after the breather sock 142 is loaded onto the sock reservoir 116, the feeder mechanisms 130 may be translated toward the chute outlet 110 and positioned such that the feeder rollers 134 (FIG. 18) protrude respectively into the ramp cutouts 194 to allow the feeder rollers 134 to engage the sock-covered mandrel side surfaces 302 (FIG. 33) for pulling the mandrel 300 out of the chute 106. The ramp 190 may guide the mandrel 300 from the chute outlet 110 into the film collar 208 (e.g., FIG. 18). In addition, the ramp 190 may support the weight of the lengthwise section of the mandrel 300 (FIG. 34) between the chute outlet 110 and the film collar 208.

As described in greater detail below, the diameter of the breather sock 142 in its natural state (e.g., radially unexpanded state) may be smaller than the width of the mandrel 300 (e.g., FIG. 16), and which causes the mandrel end 304 to engage the sock overhang 148 as the mandrel end 304 exits the chute outlet 110 as shown in FIG. 33. The engagement of the sock overhang 148 to the mandrel end 304 causes the pulling of the gathered arrangement of breather sock 142 off of the sock reservoir 116 and onto the mandrel 300 as the mandrel 300 continues to pass out of the chute outlet 110 and into the film collar 208 of the film application assembly 200 as shown in FIG. 34. The ability of the breather sock 142 to resiliently stretch (e.g., expand and contract) in the circumferential direction may cause the breather sock 142 to compress against the mandrel side surfaces 302 as the breather sock 142 is pulled onto the mandrel 300, and may thereby prevent the formation of wrinkles or creases in the sock material 144 along the mandrel side surfaces 302.

Referring to FIGS. 18-26, shown is the film application assembly 200 which includes the film material spool 206, the film collar 208 (omitted from FIGS. 7-17), and a pair of film side clamps 232 supported by a side clamp carrier 230. As mentioned above, the film application assembly 200 is configured to apply the film 202 in tubular form over the sock-covered mandrel 300 to result in a film-sock-mandrel assembly 308 (FIG. 39).

Figure 18:
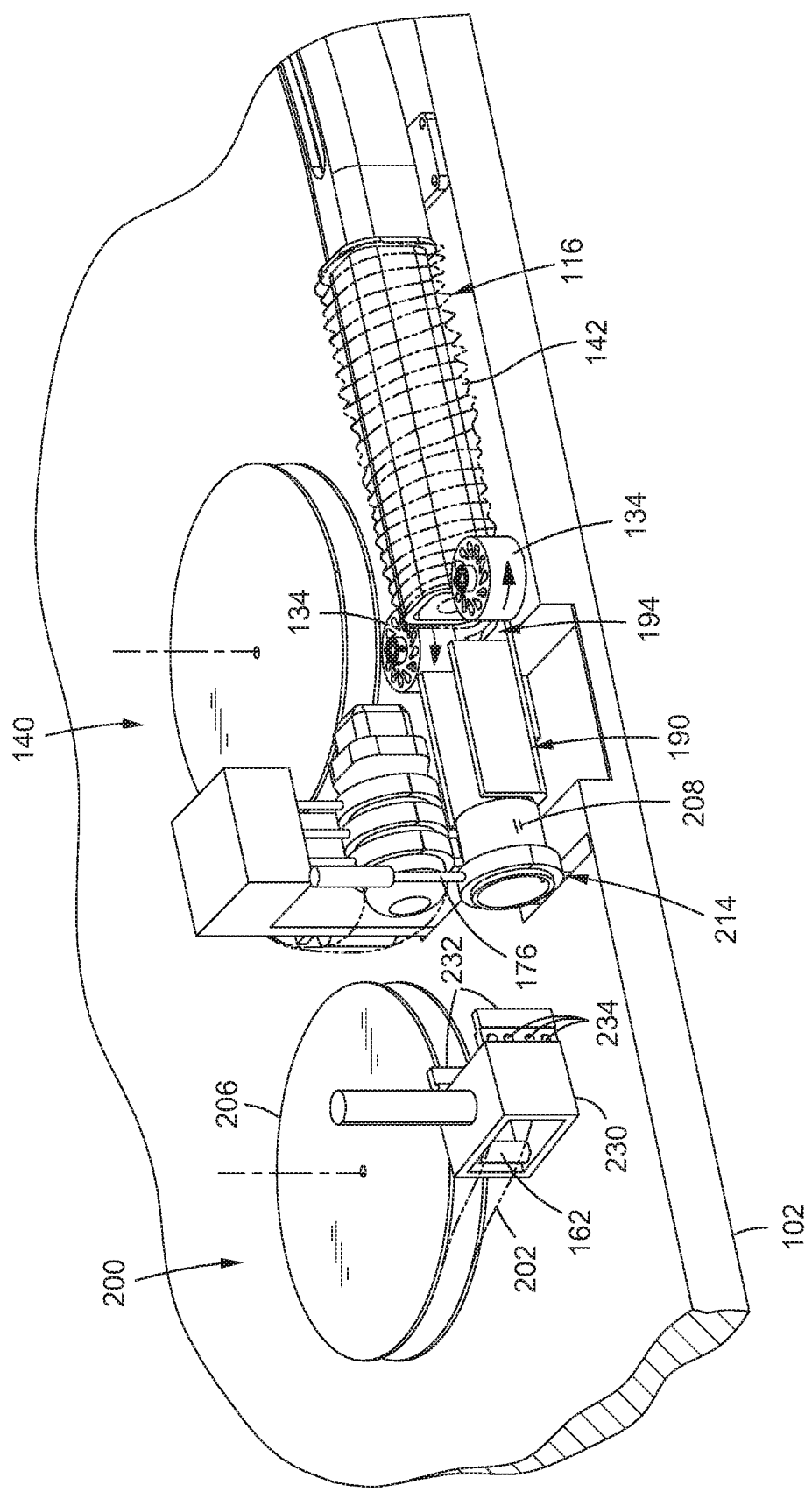
FIG. 18 shows a film collar of the film application assembly moved into alignment with the ramp.

As shown in FIG. 18, the film material spool 206 may be supported by the table 102 and may be located proximate the sock reservoir 116. The film material spool 206 may contain a continuous length of the film 202 in flattened tubular form and wound onto the film material spool 206. The film 202 may be a relatively thin material having a composition that is chemically non-reactive with the composite material of the composite stringer 406 (FIG. 45). For example, the film material may be polyolefin, polyvinylchloride, polyethylene (e.g., low density polyethylene), polypropylene or any other type of other type of film that is chemically non-reactive with the resin in the composite material. As mentioned above, the film 202 may isolate the breather sock 142 (e.g., breather layer) from the wrap composite plies (not shown) surrounding the mandrel 300, and may thereby prevent the resin of the wrap composite plies from adhering to the breather sock 142 during curing of the composite stringer 406 (FIGS. 44-45). In addition, the film 202 may facilitate the removal of the mandrel 300 from the composite stringer 406 after curing. When in the open tubular shape, the film 202 may have a diameter that preferably closely encircles the cross-sectional shape of the sock-covered mandrel 300 (i.e., the sock-mandrel assembly 306—FIG. 39). As mentioned below, the film 202 may be a shrink wrap film configured to permanently shrink when heated, causing the shrink wrap film to compress against the outer surfaces of the sock-mandrel assembly 306 as shown in FIG. 40.

In FIG. 18, the film collar 208 may be fixedly supported on the table 102 at a location downstream of the sock reservoir 116 and in alignment with the sock reservoir 116. In the example shown, the film collar 208 is supported by a collar support member 210 (FIG. 19) extending upwardly from the table 102. The film collar 208 has a collar outer surface 212 which may be cylindrical or another cross-sectional shape that is complementary to the cross-sectional shape of the sock reservoir 116.

Referring to FIGS. 18-22, the pair of film side clamps 232 may be supported by the side clamp carrier 230. As shown in FIG. 4 and described above, the side clamp carrier 230 may be supported by the gantry 250. The side clamp carrier 230 may include one or more carrier actuators (not shown) configured to provide at least three degrees of freedom for movement of the side clamp carrier 230. For example, the carrier actuators for the side clamp carrier 230 may be configured to translate the side clamp carrier 230 and the film side clamps 232 along a lateral direction (i.e., perpendicular to the lengthwise direction of the sock reservoir 116—FIG. 20), and may also translate the side clamp carrier 230 and the film side clamps 232 along a longitudinal direction (i.e., parallel to the lengthwise direction of the sock reservoir 116—FIG. 21). In addition, the carrier actuators for the side clamp carrier 230 may rotate the side clamp carrier 230 about a vertical axis as shown in FIG. 4, to enable orienting of the film side clamps 232 relative to the film collar 208. The side clamp carrier 230 may include one or more guide rollers 162 for guiding the film 202 from the film material spool 206 toward the film side clamps 232, and may prevent abrading or snagging of the film 202 on the components of the system 100.

Figure 21:
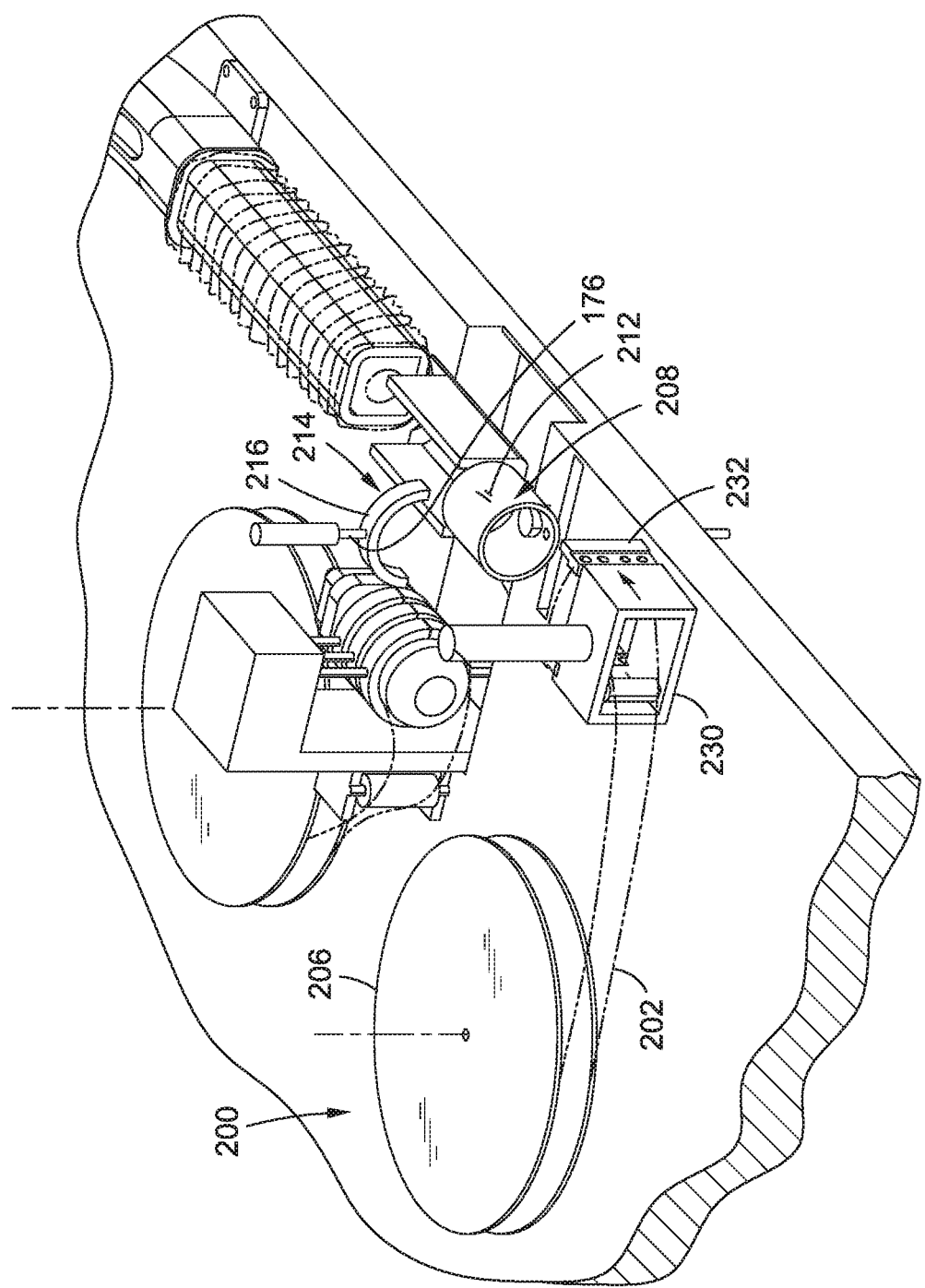
FIG. 21 shows a side clamp carrier moving a pair of film side clamps into alignment with the film collar while each one of the film side clamps maintains the end of the film in a tubular shape.
Figure 22:
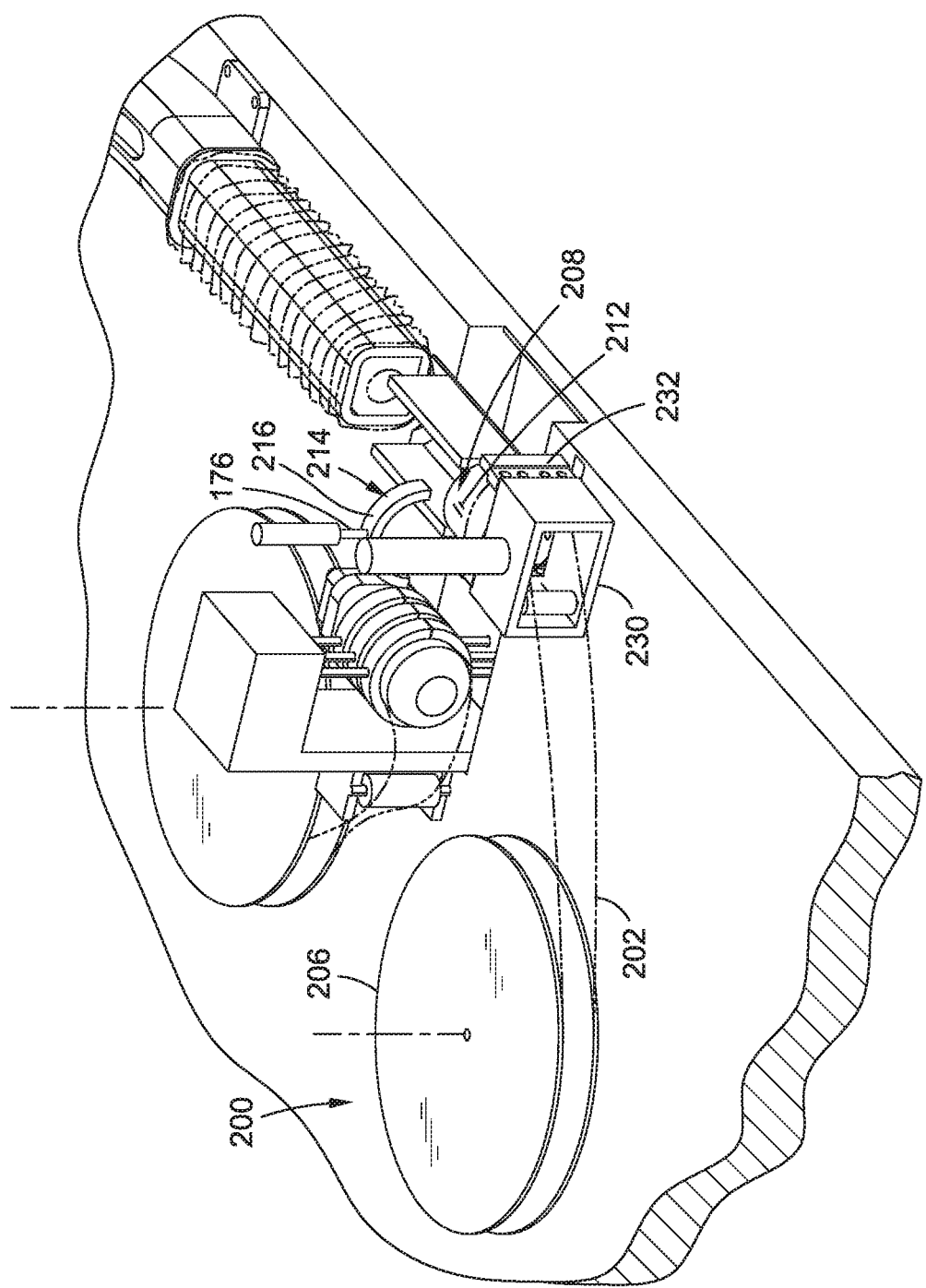
FIG. 22 shows the pair of film side clamps positioned on opposite sides of the collar outer surface of the film collar such that the film is positioned around the collar outer surface.
Figure 23:
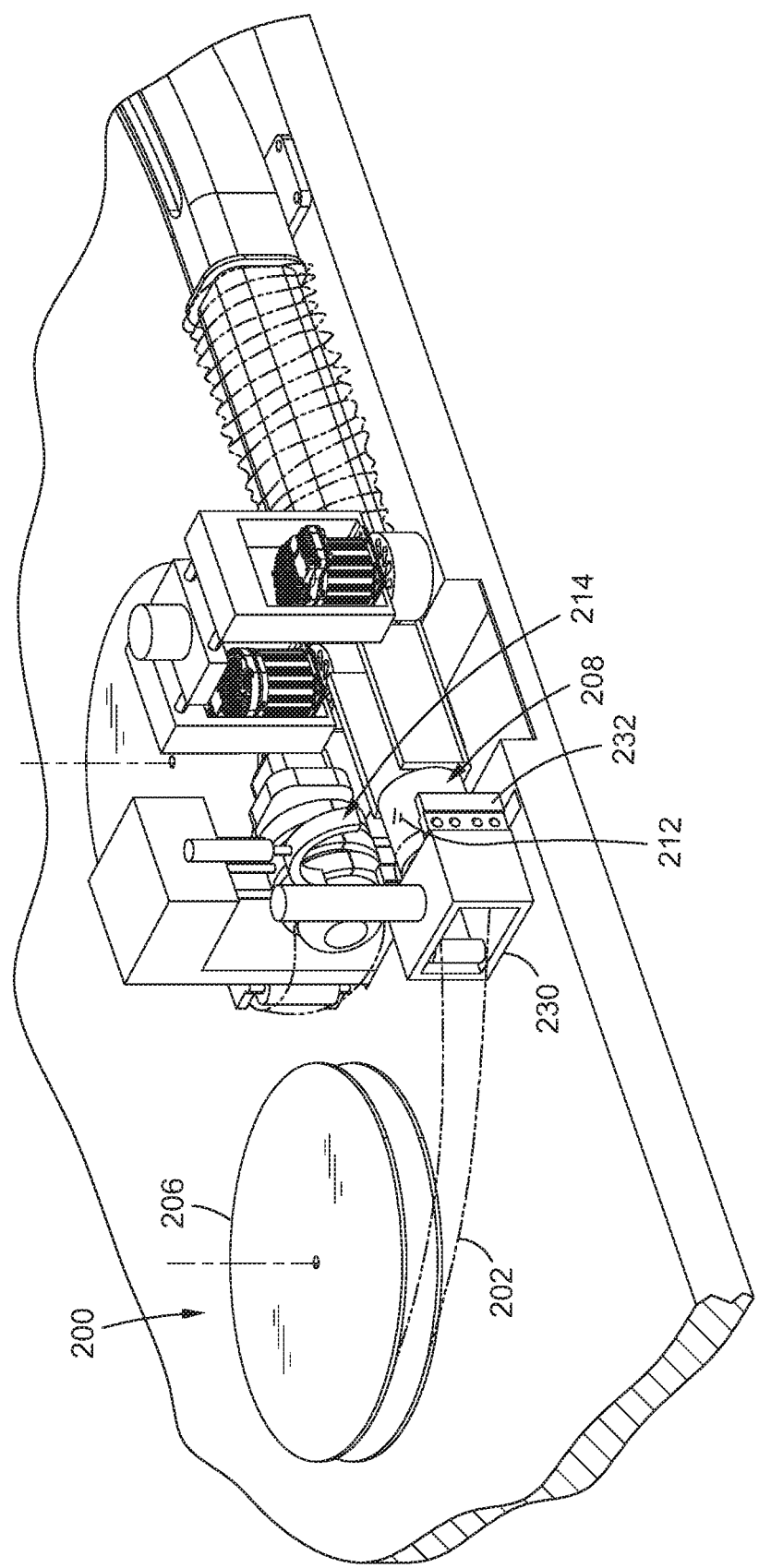
FIG. 23 is a further perspective view showing the film side clamps positioned on opposite sides of the collar outer surface.

Each one of the film side clamps 232 may include a plurality of vacuum apertures 234 (FIG. 18) extending at least partially through the thickness of each film side clamp 232. The vacuum apertures 234 may open to the inner surface of each film side clamp 232. The vacuum apertures 234 may be coupled to a vacuum pressure source (e.g., a vacuum pump—not shown) for generating vacuum pressure at the vacuum apertures 234 to enable vacuum coupling of the film side clamps 232 respectively to opposing sides of the film 202. The side clamp carrier 230 is configured to independently actuate the film side clamps 232 toward and away from each other. In this regard, the film side clamps 232 are movable into spaced relation to each other for separating the opposing sides of a flattened shape of the film 202, to thereby place the film 202 in a tubular shape to allow for installation of the film 202 over the film collar 208 as shown in FIG. 21-22. Initially, prior to operating the system 100, the opposing sides of the film 202 may be manually held (e.g., by a technician) in position respectively against the film side clamps 232 while vacuum pressure is applied to the vacuum apertures 234, after which the film application assembly 200 may operate autonomously (e.g., without human intervention) in applying the film 202 to a succession of sock-covered mandrels 300 exiting the sock application assembly 140.

Figure 19:
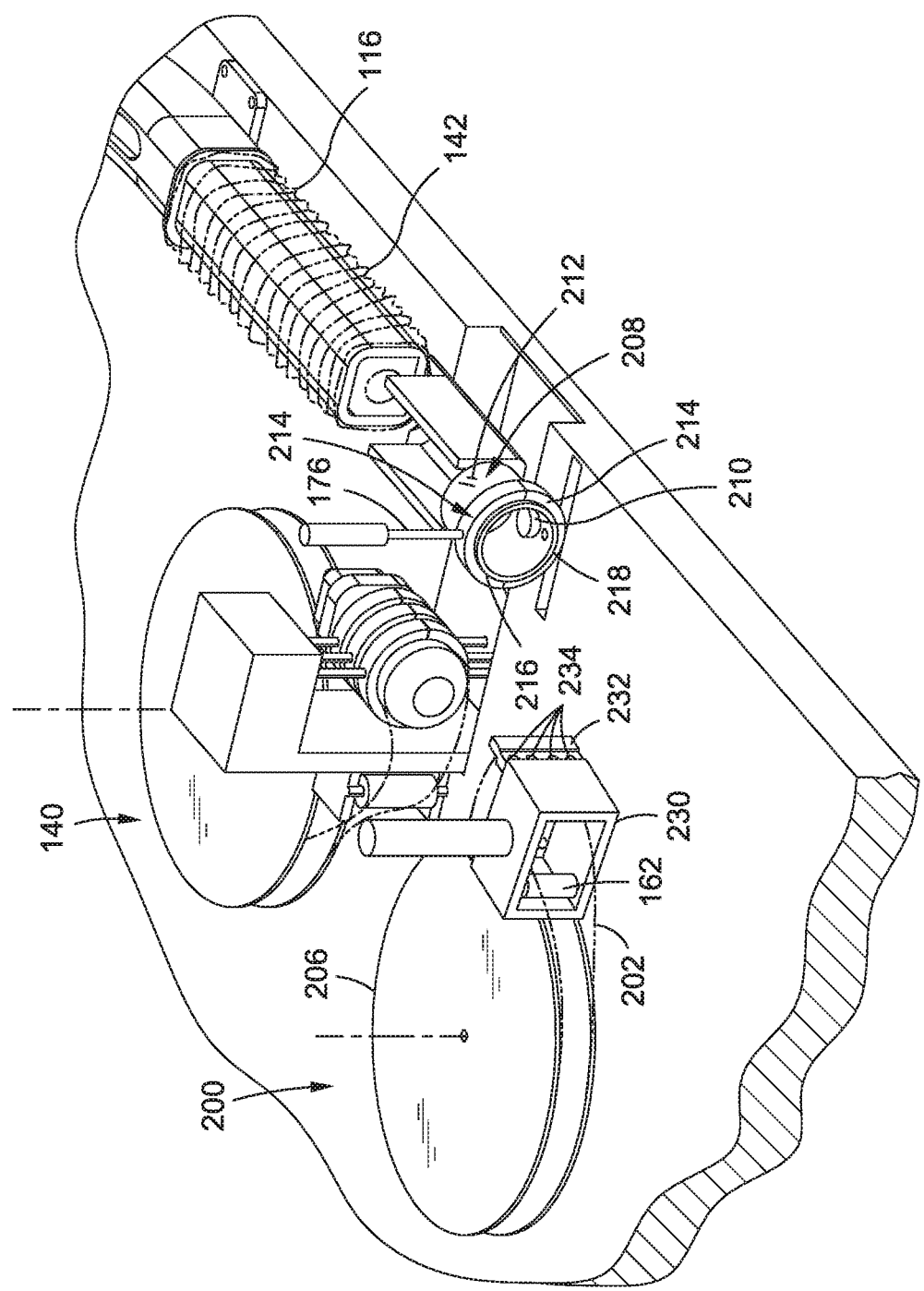
FIG. 19 is a further perspective view of the film collar aligned with the ramp.
Figure 20:
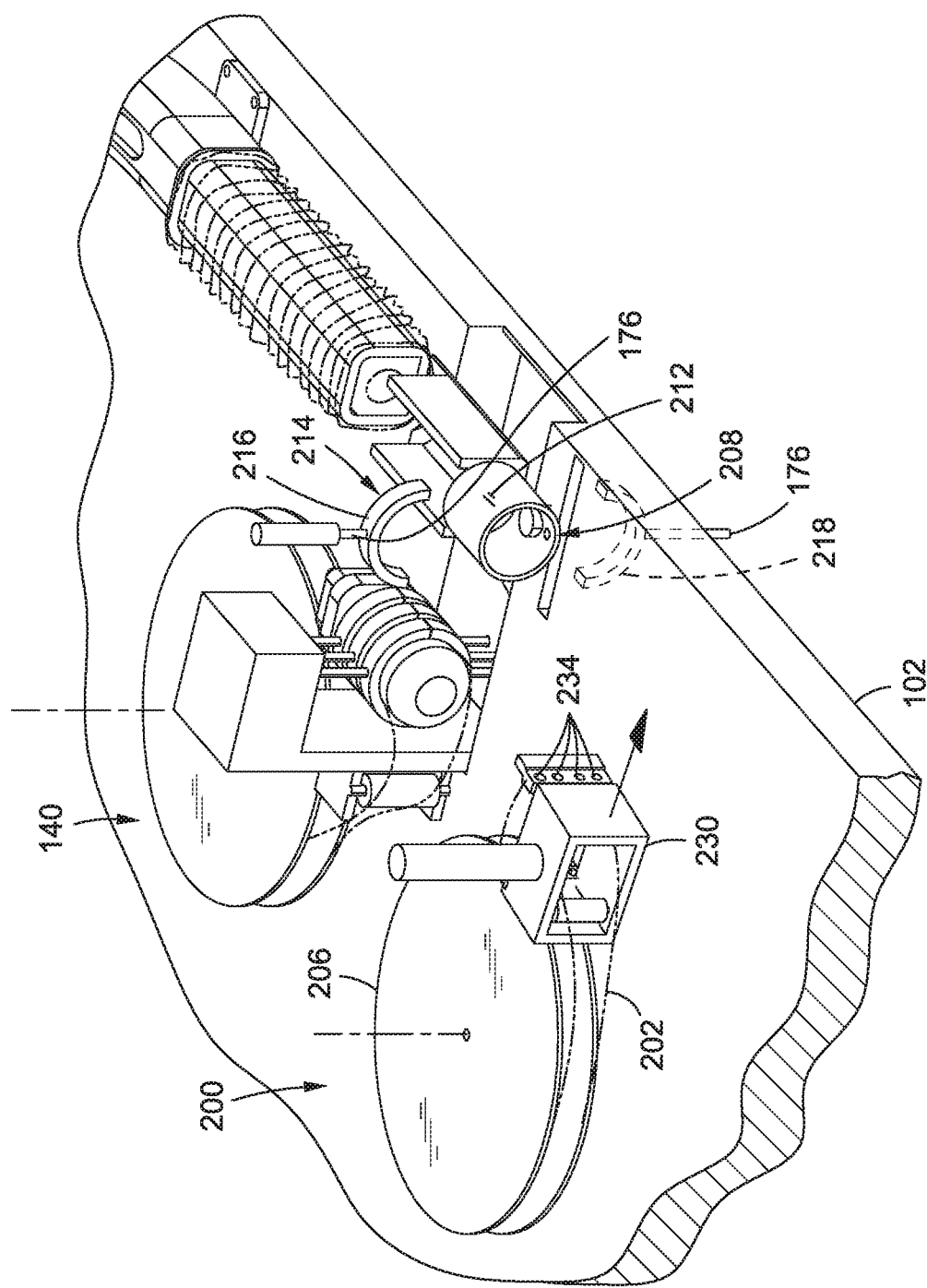
FIG. 20 shows a film collar upper and lower clamp halves decoupled from the collar outer surface of the film collar.

As shown in FIGS. 20-25, the film application assembly 200 includes a film collar clamp 214 configured to clamp the upstream end of the film 202 (e.g., in tubular form) against the collar outer surface 212 prior to the sock-covered mandrel 300 entering the film collar 208. The film collar clamp 214 may be comprised of a film collar upper clamp half 216 (FIG. 20) and a film collar lower clamp half 218 (FIG. 20) each having a semi-circular shape complementary to the cylindrical shape of the collar outer surface 212. Each of the film collar upper and lower clamp halves 216, 218 may include a radially outwardly extending post 176 which may be coupled to a clamp actuator (not shown) included with the gantry 250 (FIG. 4) and/or the table 102. In the example shown, the film collar upper and lower clamp halves 216, 218 may be respectively actuated by an upper clamp actuator (not shown) and a lower clamp actuator (not shown). The film collar upper and lower clamp halves 216, 218 are movable (e.g., via the clamp actuators) in opposing relation to each other to move the film collar upper and lower clamp halves 216, 218 on and off the collar outer surface 212 as shown in FIGS. 19-20.

Figure 24:
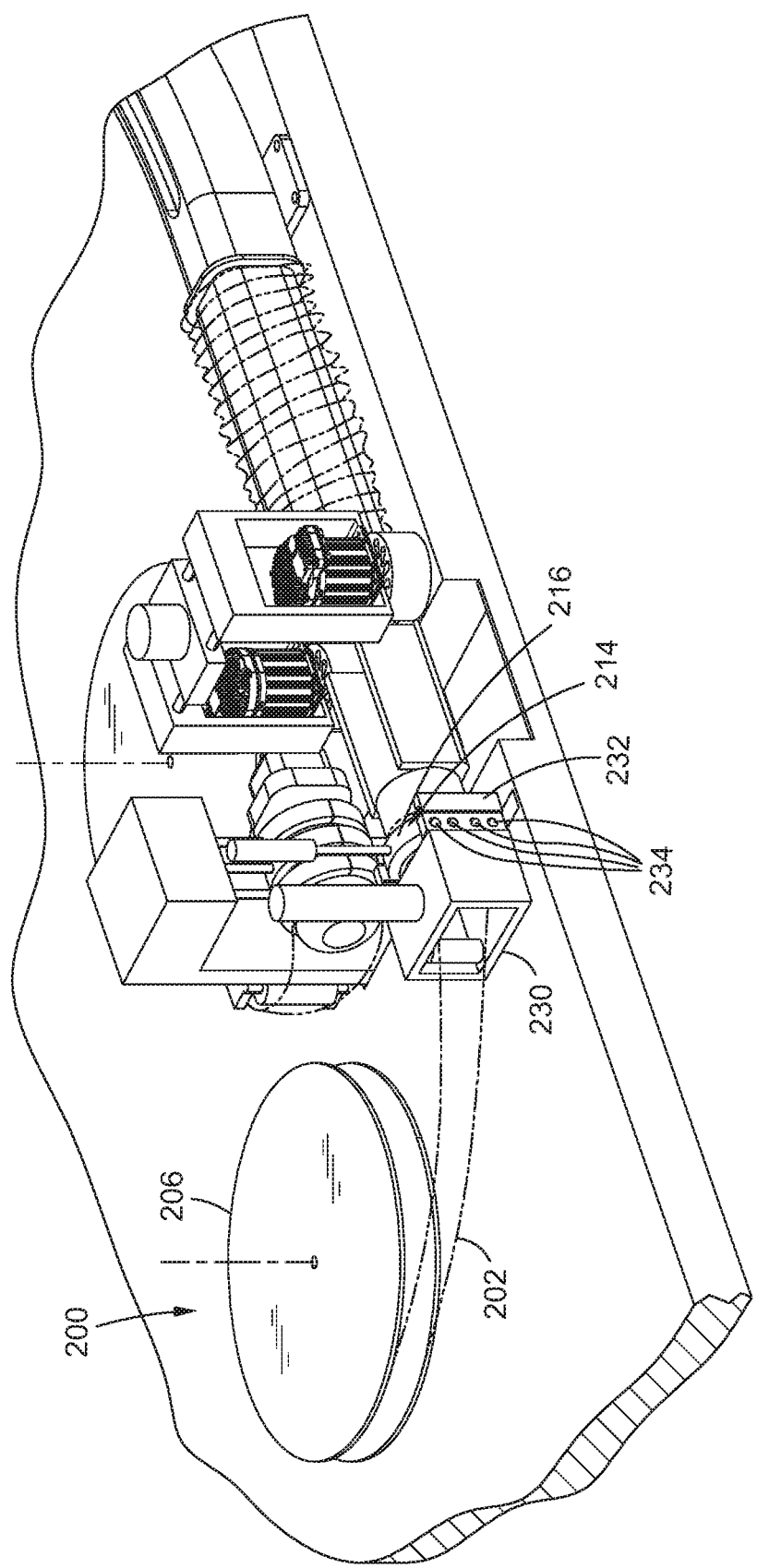
FIG. 24 shows the film collar upper and lower clamp halves re-engaged to the film collar for clamping the end of the film onto the collar outer surface.
Figure 25:
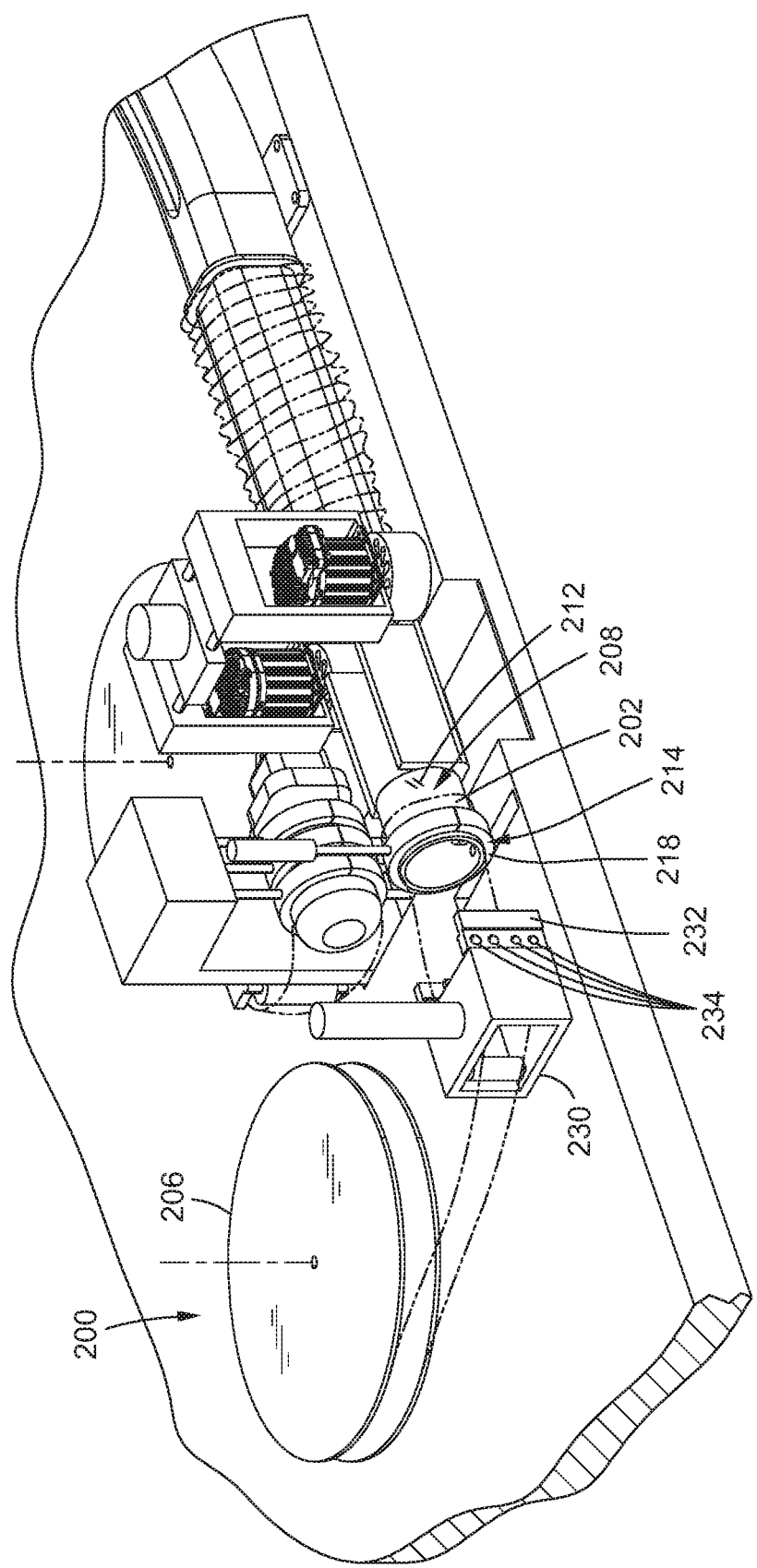
FIG. 25 shows the side clamp carrier moving the pair of film side clamps away from the film collar while the opposing sides of the film remain vacuum coupled to the film side clamps.
Figure 26:
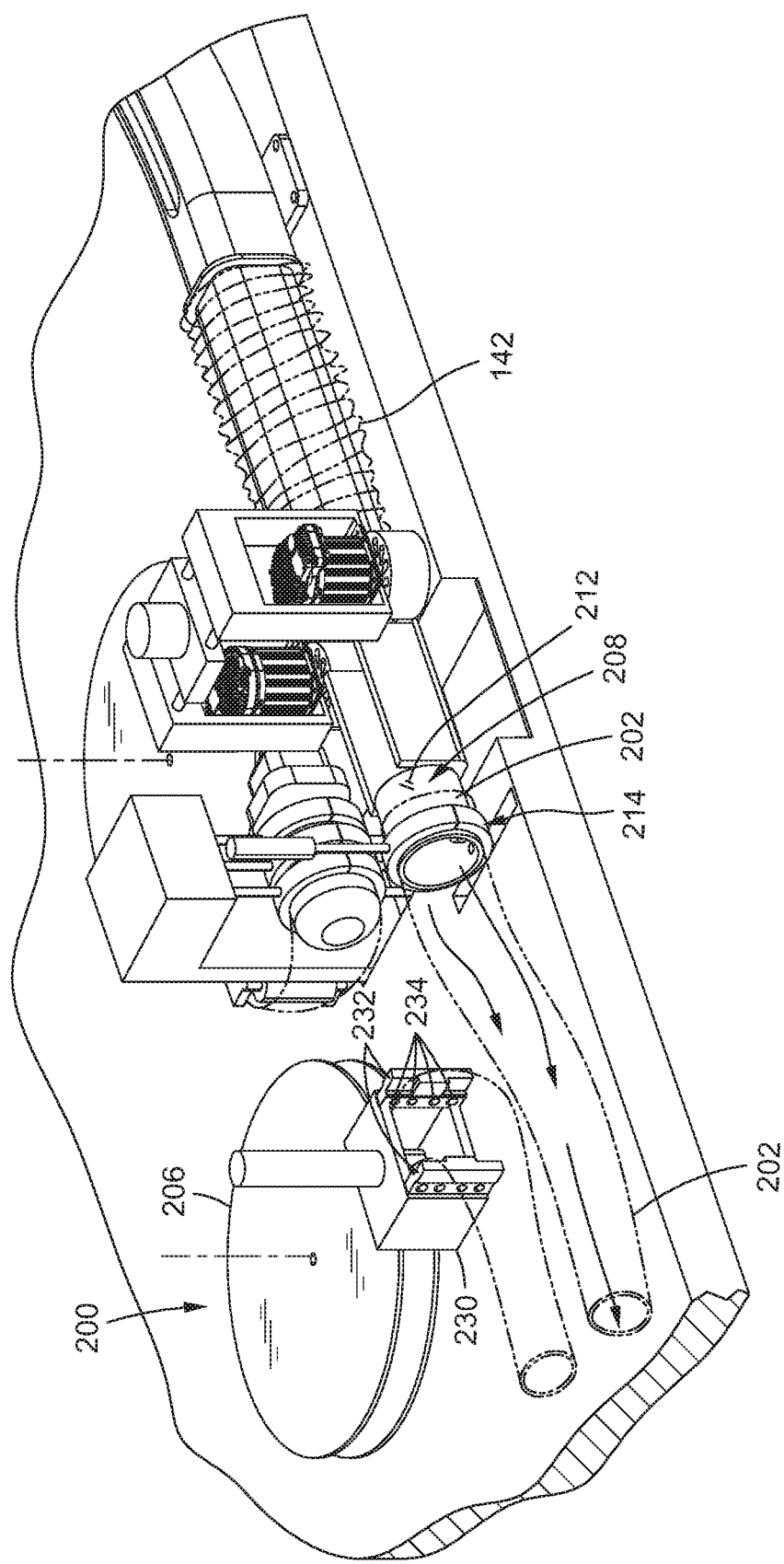
FIG. 26 shows air injected into the film collar for urging the film to extend lengthwise along a downstream direction as the film is drawn from the film material spool.

Referring to FIG. 24-26, after the upstream end of the film 202 is clamped by the film collar upper and lower clamp halves 216, 218 (FIG. 20) against the collar outer surface 212, the side clamp carrier 230 is configured to translate the film side clamps 232 out of alignment from the film collar 208 as shown in FIGS. 25-26. During translation of the film side clamps 232 via the side clamp carrier 230, the vacuum apertures 234 continue to maintain vacuum coupling (e.g., via the vacuum apertures 234) to the opposing sides of the film 202 to keep the film 202 in the open tubular shape (e.g., FIG. 26), while allowing the film 202 to slide along the inner surfaces of the film side clamps 232.

Figures 27, 28:
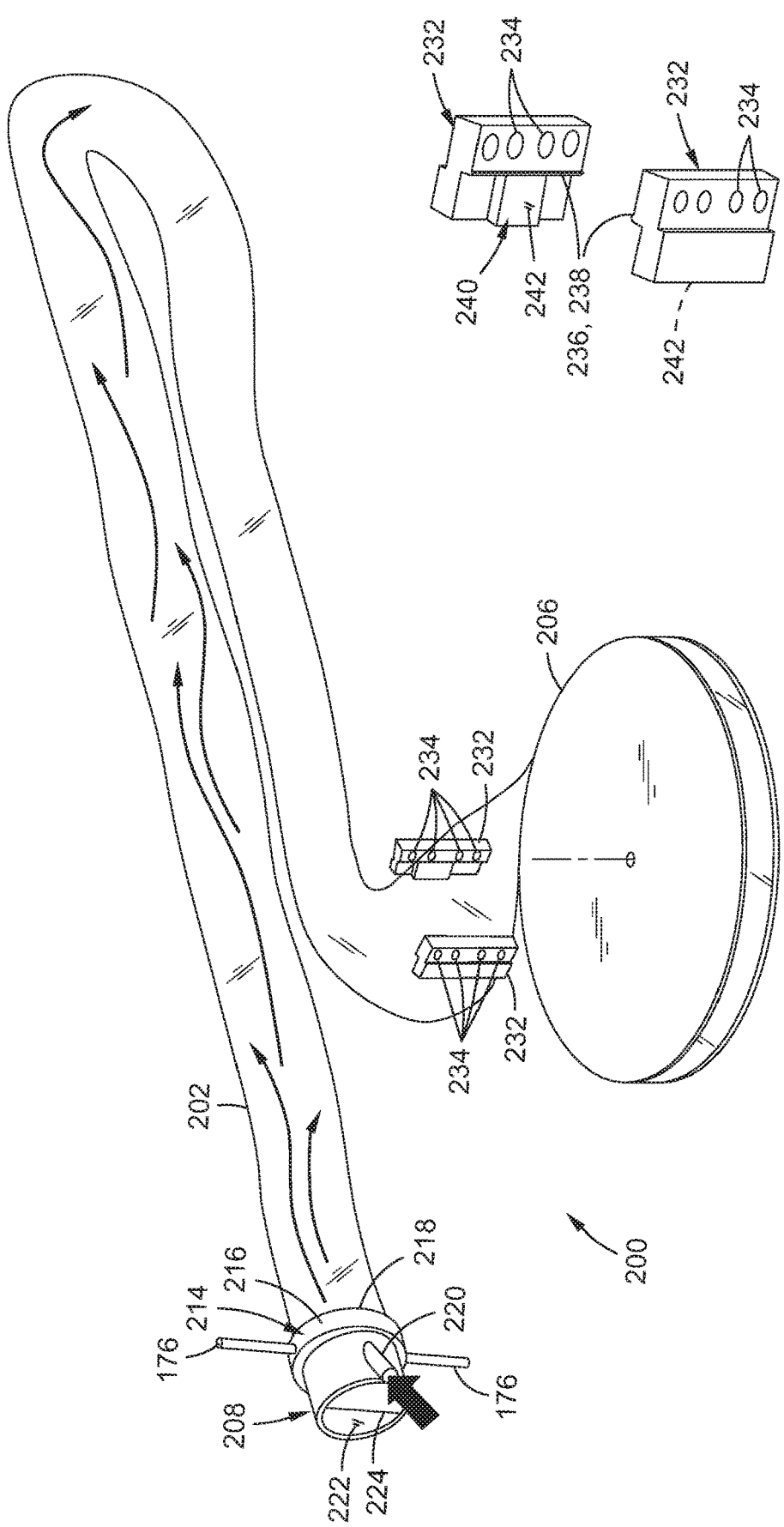
FIG. 27 is a perspective view of the film application assembly showing the film side clamps holding the film in an open tubular shape while air is injected into the film via an air injection port at the film collar.
FIG. 28 is an enlarged view of the pair of film side clamps showing a vertically oriented blade portion and a heating pad portion on an inner surface of each film side clamp.

Referring to FIGS. 25-27, the film application assembly 200 may include an air injection port 220 (FIG. 27) included with the film collar 208 and configured to inject air into the film 202 to urge the film 202 to extend along a downstream direction while the film 202 is drawn from the film material spool 206. In the example of FIG. 27, the air injection port 220 may be formed in a side of the film collar 208 at a location upstream of where the film collar upper and lower clamp halves 216, 218 engage with the collar outer surface 212. The air injection port 220 may extend through the thickness of the film collar 208, and may be coupled to a compressed air source (e.g., an air pump—not shown). The air injection port 220 may be oriented at an angle relative to the collar axis, and may point in a downstream direction to cause the injected air to partially inflate the film 202 and/or urge the film 202 in a downstream direction as shown in FIGS. 26-27. In addition, the injected air may reduce or prevent the opposing sides of the film 202 from collapsing against each other, which may facilitate insertion of the mandrel 300 into the film 202. In FIG. 26, the vacuum apertures 234 continue to maintain vacuum coupling to the opposing sides of the film 202 while allowing the film 202 to slide along the inner surfaces of the film side clamps 232 as the film 202 is drawn from the film material spool 206 and is urged in the downstream direction due to the injection of air into the film 202 at the air injection port 220.

As shown in FIG. 27, the film collar 208 may include a collar diaphragm 222. The collar diaphragm 222 may be a one-way diaphragm configured as a thin membrane formed of a resiliently flexible material (e.g., rubber, plastic, silicone, etc.) extending across an interior of the film collar 208 at a location upstream of the air injection port 220. The collar diaphragm 222 may include at least one slit 224 extending across at least a portion of a width or diameter of the collar diaphragm 222. The slit 224 may be configured to remain sealed against air pressure in the upstream direction (e.g., from air injected at the air injection port 220), while allowing the mandrel 300 to pass through the slit 224 in the downstream direction as shown in FIG. 34. Although shown as a planar member extending across the interior of the film collar 208 and having a single diametrically-oriented slit 224, the collar diaphragm 222 may be provided in any one of a variety of alternative configurations. For example, the diaphragm may be provided as a cone-shaped diaphragm (not shown) having multiple slits dividing the diaphragm into a plurality of petals that seal against each other to prevent airflow in the upstream direction. The petals may be bendable toward the downstream direction to allow the mandrel 300 to enter and pass through the diaphragm.

Figure 29:
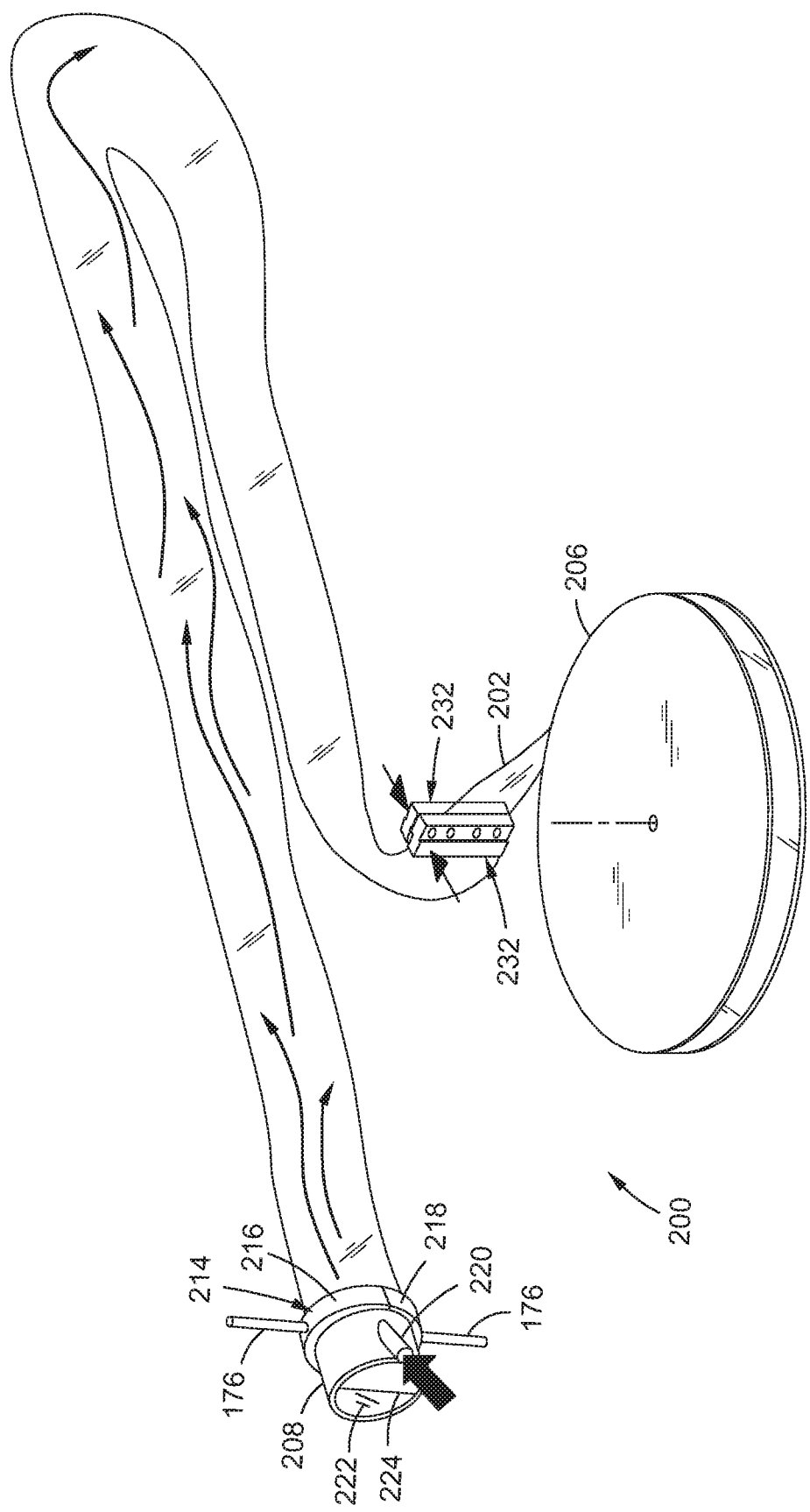
FIG. 29 shows the film side clamps moved together to cause the blade portions to cut the film, and also allowing the heating pad portions to heat seal the end of the film at the location of the cut.

Referring to FIGS. 27-29, the film application assembly 200 may include a film cutting device 236 (FIG. 28) configured to cut the film 202. The film cutting device 236 may comprise a side clamp blade portion 238 (FIG. 28) protruding inwardly from an inner surface of at least one of the film side clamps 232 for cutting the film 202 when the film side clamps 232 are laterally moved against each other with the film 202 captured between the film side clamps 232. For example, FIG. 28 shows each one of the film side clamps 232 having a side clamp blade portion 238 configured to be moved into contact with the side clamp blade portion 238 of the opposing film side clamp 232 for cutting the film 202 as shown in FIG. 29. The film application assembly 200 may be configured to cause the film cutting device 236 to cut the film 202 when the film length (e.g., extending from the film collar 208 to the film side clamps 232) is at least as long as the mandrel length. The film application assembly 200 may include one or more length sensors (not shown) for sensing the length of film 202 drawn from the film material spool 206. In one example, the film application assembly 200 may include a length sensor such as a rotary encoder included with the film material spool 206 to track the length of film 202 drawn from the film material spool 206 based on the number of revolutions of the film material spool 206.

Referring to FIGS. 28 and 30-31, the film application assembly 200 may include a heat sealing device 240 included with at least one of the film side clamps 232. The heat sealing device 240 may be configured to form a heat seal 310 (FIG. 31) along at least a portion of a width of the downstream end of the film 202 after the film 202 has been cut. As shown in FIG. 28, the heat sealing device 240 may comprise a heating pad portion 242 included on the inner surface of each film side clamp 232. Each heating pad portion 242 may be configured as a raised surface configured to locally heat the film 202. Although the heating pad portion 242 is shown having a square shape, the heating pad portions 242 may be provided in any shape. Each heating pad portion 242 may have a heating element (not shown) that is integral with or mounted to the heating pad portion 242 for generating heat. When the film side clamps 232 are brought together for cutting the film 202 as shown in FIG. 29, the heating pad portions 242 may be activated to locally heat the end of the film 202 to cause the opposing sides of the film 202 to bond together, and thereby forming a heat seal 310 in the end of the film 202. As shown in FIG. 31, the heat seal 310 may extend across a portion of the width of the film 202 to thereby form one or more air holes 204 in the end of the film 202 and through which air may escape as the mandrel 300 is inserted into the film 202.

Referring to FIGS. 32-35, shown in FIGS. 32-33 is the downstream end of the mandrel 300 exiting the chute outlet 110 under the urging of the feeder mechanisms 130 located at the chute inlet 108 (FIGS. 1-3). FIG. 32 shows the sock overhang 148 extending over the edge of the chute outlet 110. Also shown FIG. 32 is the film collar clamp 214 clamping the film 202 to the collar outer surface 212 of the film collar 208. FIG. 33 shows the injection of air into the air injection port 220 in the film collar 208. Also shown is the mandrel end engaging the sock overhang 148 which causes breather sock 142 to be drawn off of the sock reservoir 116 while the feeder rollers 134 of the feeder mechanisms 130 bear against the opposite sides of the mandrel 300 for urging the mandrel downstream. FIG. 34 shows the sock-covered mandrel 300 entering the collar diaphragm 222 of the film collar 208 under the urging of the feeder mechanisms 130. Air may be continuously injected into the air injection port 220, causing the film 202 to partially inflate and/or extend in a downstream direction. FIG. 35 shows the upstream end of the mandrel 300 moved past the feeder mechanisms 130 of the chute outlet 110.

Referring to FIGS. 36-38, the feeder mechanisms 130 of the system 100 may include a mandrel shaker 260 located downstream of the film collar 208 for urging the final section of the mandrel 300 into the film 202 after the upstream mandrel end moves downstream of the feeder mechanisms 130 at the chute outlet 110 (FIG. 35). The mandrel shaker 260 may include a trough 262 oriented at a downward-sloping angle along a downstream direction. The trough 262 may be oriented at a downward sloping angle of up to 30 degrees relative to horizontal degrees from horizontal. The upstream end of the trough 262 may be at an elevation that is no higher than the elevation of the lowest point of the interior of the film collar 208 to avoid the mandrel end snagging on the trough 262 as the mandrel end exits the film collar 208. The mandrel shaker 260 may be positioned underneath a lengthwise section of the film-sock-covered mandrel 300 downstream of the film collar 208 for supporting the mandrel 300 as it moves downstream and onto the surface of the table 102. The trough 262 may have a cross-section that is V-shaped or U-shaped for centering the mandrel 300 on the trough 262.

In FIGS. 36-38, the mandrel shaker 260 may include a plurality of mandrel vibration devices 264 incorporated into the trough 262. The mandrel vibration devices 264 may be configured to periodically and quickly move upwardly and downwardly to briefly poke the underside of the mandrel 300. In this regard, the mandrel vibration devices 264 may be configured to vibrate the section of the mandrel 300 passing over the trough 262 in a manner promoting the mandrel 300 to slide toward the downstream end of the film 202. The mandrel vibration devices 264 may be located at spaced intervals along the length of the trough 262. Although FIG. 36 shows five (5) mandrel vibration devices 264, any number of mandrel vibration devices 264 may be provided. In the examples shown, the mandrel vibration devices 264 may be configured as shaker actuators 266 or as thrusting elements 268 (FIGS. 37-38). The shaker actuators 266 and/or the thrusting elements 268 may be actuated simultaneously or in succession. Actuating the shaker actuators 266 and/or the thrusting elements 268 in succession may result in a peristaltic type of movement in the section of the mandrel 300 passing over the mandrel shaker 260, and which may promote movement of the mandrel 300 toward the downstream end of the film 202.

FIG. 37 shows the shaker actuators 266 configured as pneumatically driven air cylinders which may be fluidly coupled to a fluid pressure source 276 (FIG. 36). However, the shaker actuators 266 may be hydraulically driven (e.g., hydraulic cylinders) and/or electro-mechanically driven. Referring to FIG. 38, as an alternative to shaker actuators 266, each mandrel vibration device 264 may be configured as a vertically-oriented thrusting element 268 that is mechanically pushed upwardly from the bottom end of the thrusting element 268. For example, the mandrel shaker 260 may include a continuous loop belt 270 oriented lengthwise underneath the trough 262. The belt 270 may extend between two (2) pulleys 272 and may be driven by an electric motor. The belt 270 may include one or more raised bosses 274 mounted on an outward facing surface of the belt 270. When the motor is activated causing the belt to move around the pulleys 272, the one or more raised bosses 274 may briefly push the bottom of each of the vertically-oriented thrusting element 268 upwardly as the one or more bosses 274 pass underneath each thrusting element 268, thereby creating a peristaltic movement in the section of the mandrel 300, and urging the final section of the mandrel 300 downstream into the film 202. As shown in FIG. 30, the film 202 may be maintained in an open tubular shape by the injection of air to facilitate insertion of the mandrel 300.

Referring to FIGS. 1-2 and 39-40, shown in FIG. 39 is an example of a film-sock-mandrel assembly 308 in which the film 202 loosely surrounds the sock-covered mandrel 300. In some examples, the film 202 may be a shrink wrap film configured to permanently shrink when heated. As shown in FIGS. 1-2, the system 100 may optionally include a heat shrink device 280 located downstream of the film application assembly 200. The heat shrink device 280 may be configured to apply heat to the shrink wrap film of the film-sock-mandrel assembly 308 in a manner causing the shrink wrap film to contract, and thereby compressing the breather sock 142 against the mandrel side surfaces 302 as shown in FIG. 40. The heat shrink device 280 may be a stationary heat shrink oven 282. Alternatively, the heat shrink oven 282 may be mounted on rails (not shown) secured to the table 102 and along which the heat shrink oven 282 may move in a back-and-fourth motion over the film-sock-mandrel assembly 308 for heating the shrink wrap film. In a still further example, the heat shrink device 280 may comprise a plurality of heat guns (not shown) configured to blow hot air onto the shrink wrap film of the film-sock-mandrel assembly 308.

Figure 46:
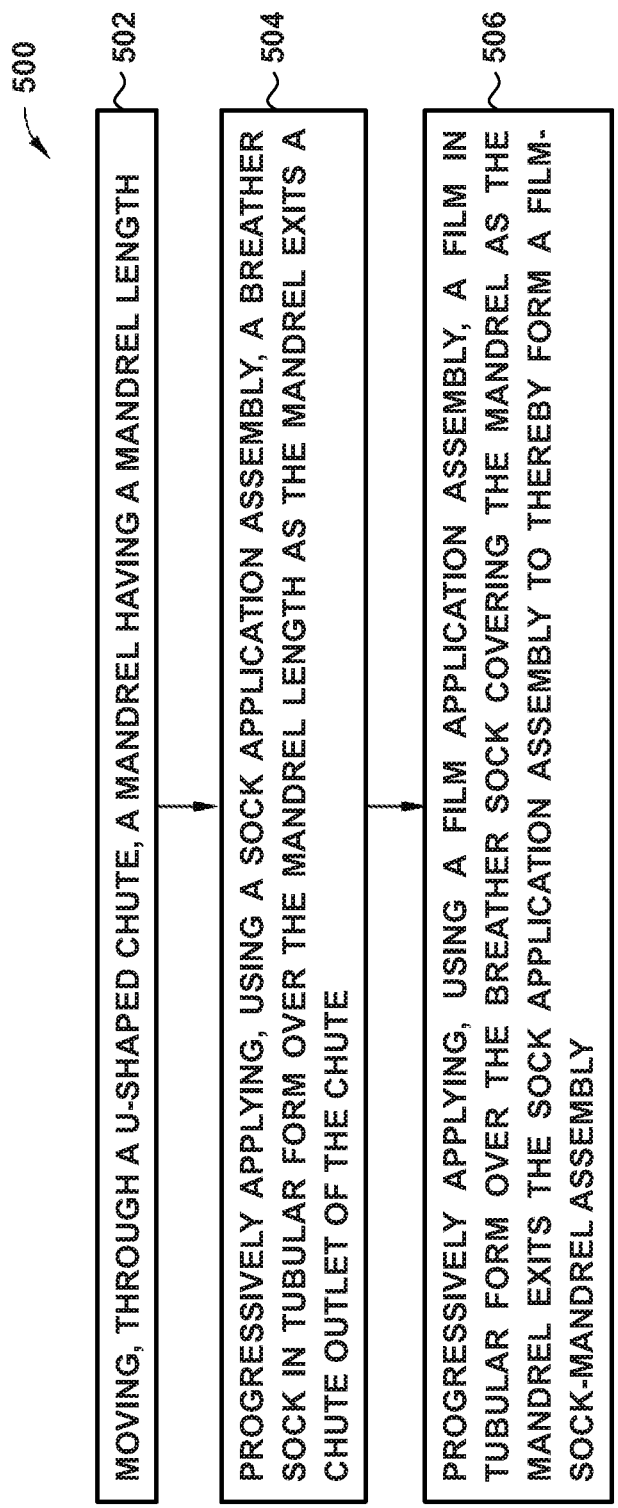
FIG. 46 is a flow chart of operations included in a method of preparing a mandrel for use in manufacturing a composite stringer.

FIG. 46 is a flow chart of operations included in a method 500 of preparing a mandrel 300 for use in manufacturing a composite stringer 406. The method 500 includes step 502 of moving the mandrel 300 through the U-shaped chute 106. FIG. 3 shows a the above-described pair of feeder mechanisms 130 located proximate the chute inlet 108 for pushing the mandrel 300 into the chute inlet 108 and urging the mandrel 300 through the chute 106 via rotation of feeder rollers 134 bearing against the mandrel side surfaces 302.

The method 500 additionally includes step 504 of gradually or progressively applying, using the sock application assembly 140, the breather sock 142 in tubular form over the mandrel length as the mandrel 300 exits the chute outlet 110. Referring to FIGS. 6-12, prior to applying the breather sock 142 over the mandrel 300, the method may initially comprise installing (e.g., manually) an end of the breather sock 142 over the sock baton 150. As shown in FIG. 6, the breather sock 142 may be drawn from the sock material spool 146 and initially manually applied over the sock baton 150 while the baton ring clamps 164 are moved away from the baton outer surface 152.

The method may additionally include translating the sock baton 150 into engagement with the chute outlet 110 using the baton carrier 158 supporting the baton clamp assembly 160 which supports the sock baton 150. Referring to FIGS. 7-8, step 504 may additionally comprise clamping, using at least one baton ring clamp 164, the breather sock 142 against the baton outer surface 152 during translation of the sock baton 150 into engagement with the chute outlet 110. In the example shown, the baton clamp assembly 160 includes three (3) baton ring clamps 166, 168, 170 which may be used to clamp the breather sock 142 to the sock baton 150, as described above.

Referring to FIGS. 9-12, with the sock baton 150 engaged to the chute outlet 110, the method may additionally include decoupling the at least one baton ring clamp 164 from the baton outer surface 152 prior to pulling the breather sock 142 over the sock baton 150 and onto the sock reservoir 116. FIG. 9 shows the upstream baton ring clamp 166, the center baton ring clamp 168, and the downstream baton ring clamp 170 separated away from the baton outer surface 152. FIG. 10 shows the baton carrier 158 translating the baton ring clamps 166, 168, 170 away from the sock baton 150, and the feeder mechanism carrier 132 translating the feeder mechanisms 130 from the sock reservoir 116 to the sock baton 150. FIG. 11 shows the feeder mechanisms 130 laterally translated toward the baton outer surface 152 for engaging the breather sock 142, for pulling the breather sock 142 from the sock baton 150, over the baton-reservoir transition portion 154, and onto the reservoir outer surface 120. Once the feeder mechanisms 130 are moved back into position on opposite sides of the sock reservoir 116 as shown in FIG. 12, the feeder mechanisms 130 may rotate the feeder rollers 134 for drawing the breather sock 142 from the sock material spool 146 and pulling the breather sock 142 over the sock baton 150 and onto the sock reservoir 116. As a result of rotating the feeder rollers 134, the method may include accumulating, on the sock reservoir 116, a gathered arrangement of the breather sock 142 in a sock length that is at least as long as the mandrel length as shown in FIG. 12.

Referring to FIGS. 13-16, with the breather sock 142 loaded onto the sock reservoir 116, the method may include cutting the breather sock 142 using a sock cutting device 178. The breather sock 142 may be cut to a sock length that is at least as long as the mandrel length. FIG. 13 shows the center baton ring clamp 168 disengaged from the baton outer surface 152 while the downstream baton ring clamp 170 and upstream baton ring clamp 166 remain engaged for clamping the breather sock 142 to the sock baton 150. As described above, the baton upper and lower clamp halves 172, 174 of the center baton ring clamp 168 may each include a baton clamp blade portion 180 protruding radially inwardly from inner surfaces of the baton upper and lower clamp halves 172, 174. FIG. 14 shows the clamp halves 172, 174 of the center baton ring clamp 168 re-engaged to the sock baton 150 and cutting the breather sock 142 against the baton outer surface 152. After cutting the breather sock 142, the baton carrier 158 may translate the sock baton 150 away from the chute outlet 110 as shown in FIG. 15. The baton carrier 158 may then laterally translate the baton clamp assembly 160 and the sock baton 150 out of alignment with the chute outlet 110, while simultaneously laterally translating the ramp 190 into alignment with the chute outlet 110. As mentioned above, the ramp 190 may support the section of the mandrel 300 extending between the chute outlet 110 and the film collar 208.

Referring to FIGS. 18-26, the method 500 includes step 506 of gradually or progressively applying, using the above-described film application assembly 200, the film 202 in tubular form over the breather sock 142 covering the mandrel 300 as the mandrel 300 exits the sock application assembly 140 to thereby form a film-sock-mandrel assembly 308. Step 506 of applying the film 202 over the breather sock 142 may comprise vacuum coupling opposing sides of the film 202 respectively to the pair of film side clamps 232 as shown in FIG. 18. As described above, the method may include engaging the vacuum apertures 234 in the film side clamps 232 to the opposing sides of the film 202. The side clamp carrier 230 may actuate the film side clamps 232 into spaced relation to each other as a means for maintaining the free end of the film 202 in a tubular shape.

The method may include disengaging the film collar upper and lower clamp halves 216, 218 from the collar outer surface 212 as shown in FIGS. 20-22. The method may further include translating the side clamp carrier 230 and film side clamps 232 into alignment with the film collar 208 as shown in FIGS. 21-22, and installing the free end of the film 202 over the collar outer surface 212 of the film collar 208. As shown in FIG. 24, the method may include clamping the free end of the film 202 against the collar outer surface 212 prior to the mandrel 300 exiting the film collar 208 and entering the film 202. In this regard, the film collar upper and lower clamp halves 216, 218 may be re-engaged to the film collar 208 to clamp the film 202 to the collar outer surface 212. With the film 202 clamped to the film collar 208, the method may include translating the side clamp carrier 230 and the film collar upper and lower clamp halves 216, 218 away from the film collar 208 and out of alignment with the sock reservoir 116 as shown in FIGS. 25-26. As mentioned above, the opposing sides of the film 202 may be remain in vacuum engagement to the film side clamps 232 during translation of the side clamp carrier 230.

Referring to FIGS. 26-27, step 506 of applying the film 202 over the breather sock 142 covering the mandrel 300 may further comprise injecting air into the film 202 using an air injection port 220 (FIG. 27) included with the film collar 208. As described above, the air injection port 220 may extend into the side of the film collar 208 and may be coupled to a positive air pressure source (not shown) for injecting pressurized air into the film 202. As a result, the method may include urging the film 202 to extend along a downstream direction while the film 202 is drawn from the film material spool 206, as shown in FIG. 27. As described above, the opposing sides of the film 202 may be remain in vacuum engagement to the film side clamps 232 as air is injected into the film 202, causing the film 202 to be partially inflated and urging the film 202 to extend along the downstream direction. The injection of air into the film 202 may include restricting or preventing the flow of air in the upstream direction using the above-described collar diaphragm 222 which may be mounted in the film collar 208 at a location upstream of the air injection port 220, as shown in FIG. 27.

Referring to FIGS. 27-29, the method may include cutting, using the film cutting device 236, the film 202 to a film length that is at least as long as the mandrel length. As described above and shown in FIG. 28, the film cutting device 236 may comprise a side clamp blade portion 238 incorporated into the inner surface of each one of the film side clamps 232. Once there is a sufficient length of the film 202 extends between the film collar 208 and the film side clamps 232 as shown in FIG. 27, the side clamp carrier 230 may actuate the film side clamps 232 toward each other as shown in FIG. 29, and cause the side clamp blade portions 238 to cut the film 202.

Referring to FIG. 31, step 506 of applying the film 202 over the breather sock 142 covering the mandrel 300 may additionally comprise heat sealing, using a heat sealing device 240 included with at least one of the film side clamps 232, a downstream end of the film 202. As described above and shown in FIG. 20, heat sealing may be performed by the heating pad portions 242 that may be included in the inner surfaces of each one of the film side clamps 232. Heat sealing of the film 202 may be formed at approximately the same time as the cutting of the film 202. Heat sealing may be performed such that one or more air holes 204 are formed in the end of the film 202 to allow the escape of air from the film 202 as the mandrel 300 is gradually or progressively inserted further into the film 202. As shown in FIG. 30, the injection of air into the film 202 via the air injection port 220 causes the film 202 to be extended along the downstream direction.

FIG. 39 shows an example of the film-sock-mandrel assembly 308 in which the film 202 may loosely surround the sock-covered mandrel 300. For examples where the film 202 is a shrink wrap film, the method may comprise applying heat to the shrink wrap film of the film-sock-mandrel assembly 308 in a manner causing the shrink wrap film to shrink and compress against mandrel side surfaces 302 of the mandrel 300 as shown in FIG. 40. As shown in FIGS. 1-2 and described above, the system 100 may include a heat shrink device 280 such as a heat shrink oven located downstream of the film application assembly 200 for heating the shrink wrap film.

Referring briefly to FIGS. 36-38, the method may optionally include vibrating the mandrel 300 to urge the final section of the mandrel 300 into the film 202 after the upstream mandrel end has passed the feeder mechanisms 130 at the chute outlet 110. As described above, the method may include urging the plurality of mandrel vibration devices 264 in an up-and-down motion for generating peristaltic movement in the section of the mandrel 300 passing over the downwardly sloped trough 262 shown in FIG. 36. Sequential urging of the mandrel vibration devices 264 may include sequentially actuating a plurality of shaker actuators 266 as shown in FIGS. 36-37, and which may be pneumatically or hydraulically driven. Alternatively, sequential actuation of the mandrel vibration devices 264 may include sequentially bumping or poking the bottom of each of the plurality of vertically-oriented thrusting elements 268 as shown in FIG. 38 using one or more bosses 274 mounted to a continuous loop dealt positioned underneath the series of thrusting elements 268, as described above.

As mentioned above and shown in FIG. 2, the system 100 may include a controller or processor 104 which may be configured to control, via control lines 105, the operation of any one or more of the system components in a coordinated and/or synchronized manner. For example, the processor 104 may transmit control signals over control lines 105 to control the actuation (e.g., the starting, stopping, and rotational direction) of the feeder mechanisms 130. In addition, the processor 104 may transmit control signals over control lines 105 to control the operation of the carrier actuators for controlling the translation of the feeder mechanisms 130 at the chute outlet 110. In addition, the processor 104 may transmit control signals over control lines 105 to control the operation of the components of the sock application assembly 140 including: the starting and stopping of the rotation of the sock material spool 146, the operation of the carrier actuators for translating the baton carrier 158, and the operation of the clamp actuators for actuating the baton ring clamps 164 and the sock cutting device 178. In addition, the processor 104 may transmit control signals over control lines 105 to control the operation of the components of the film application assembly 200 including: the starting and stopping of the rotation of the film material spool 206, the operation of the clamp actuators for actuating the film collar clamp 214, the actuation of a compressed air source (not shown) for providing pressurized air to the air injection port 220, the actuation of the carrier actuators for translating and orienting the side clamp carrier 230, the operation of the clamp actuators for actuating the film side clamps 232 toward and away from each other, the actuation of a vacuum pressure source (not shown) for generating vacuum pressure at the vacuum apertures 234 in the film side clamps 232, the heating of the heating pad portions 242 of the film side clamps 232, and the actuation of the shrink wrap device 280 for heat shrinking the shrink wrap film of a film-sock-mandrel assembly 308. In addition, the processor 104 may control the operation of the components of the mandrel shaker 260 for urging the final section of the mandrel 300 into the film 202.

Figure 41:
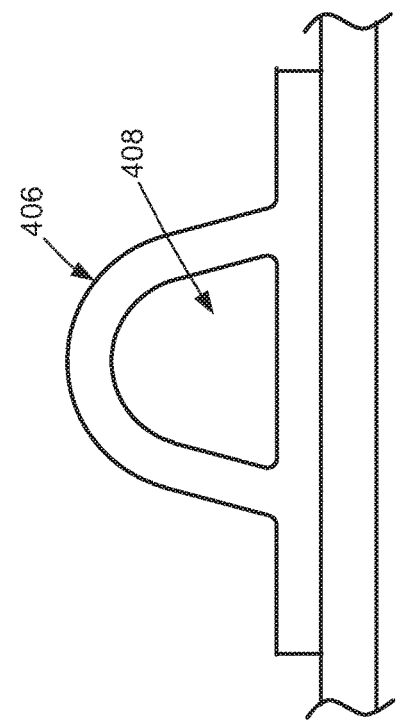
FIG. 41 is a perspective view of an example of an aircraft formed at least partially of composite material.
Figure 42:
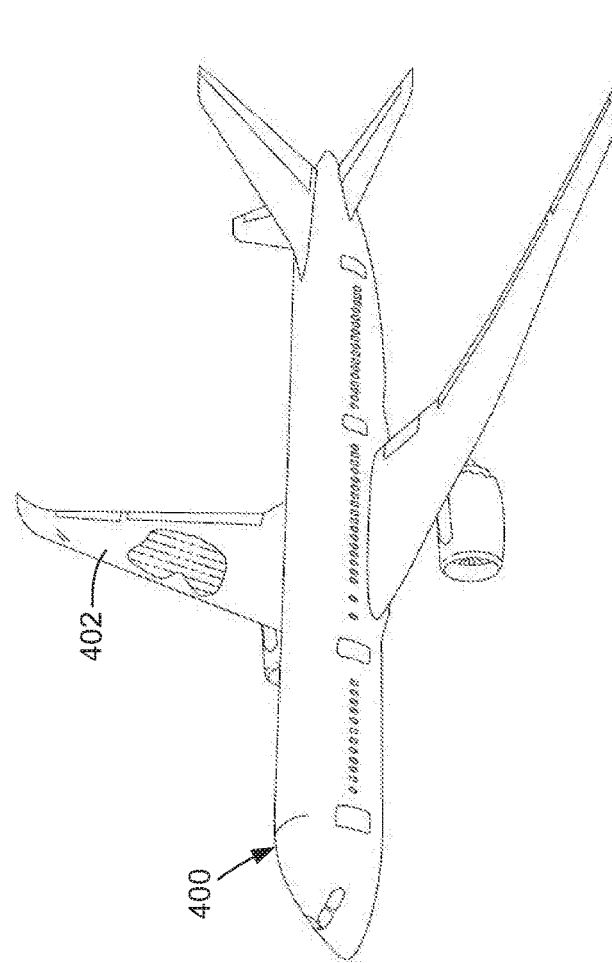
FIG. 42 is a perspective view of an example of a composite wing panel comprised of a composite skin panel and a plurality of composite stringers.
Figure 43:
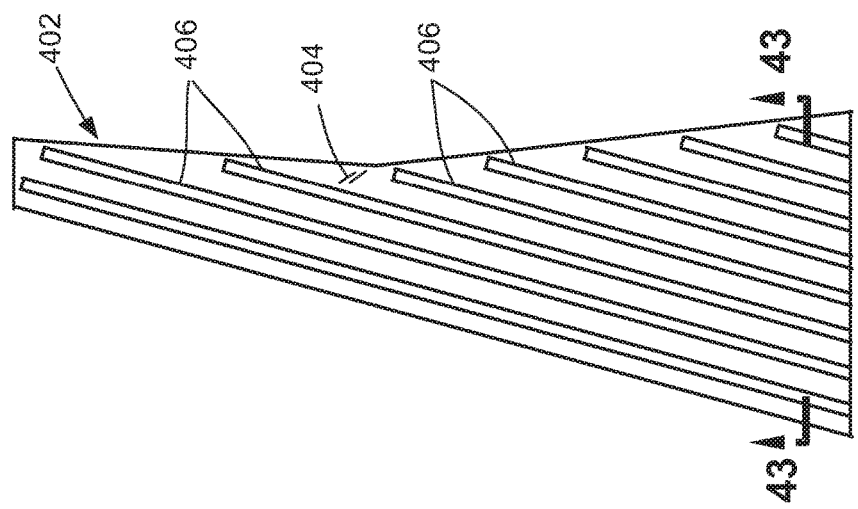
FIG. 43 is a cross-sectional view taken along Line 43 of FIG. 42 and showing the composite stringers co-cured or co-bonded to the composite skin panel.

Referring to FIGS. 41-45, shown in FIG. 41 is example of an aircraft 400 which may include one or more components formed of composite material, such as a wing having a composite wing skin 402. FIG. 42 shows an example of a composite wing skin 402 comprised of a composite skin panel 404 and a plurality of longitudinally extending composite stringers 406 located on the skin inner surface. The composite wing skin 402 and/or the composite stringers 406 may be manufactured using one or more film-sock-mandrel assemblies 308 (e.g., FIG. 45) produced using the above-described system 100 and method 500. FIG. 43 is a sectional view of the composite wing skin 402 showing the plurality of composite stringers 406 mounted on the skin inner surface. FIG. 44 is an enlarged view of one of the composite stringers 406 co-cured or co-bonded to the composite skin panel 404. FIG. 45 shows an example of a film-sock-mandrel assembly 308 protruding from a cavity 408 of a composite stringer 406 that may be formed and/or cured with the film-sock-mandrel assembly 308 installed in the cavity 408.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A system for automated preparation of a mandrel for use in composite stringer manufacturing, comprising:
a U-shaped chute having a chute inlet and a chute outlet and configured to receive a mandrel having a mandrel length;
one or more feeder mechanisms configured to move the mandrel into the chute inlet and through the chute;
a sock application assembly configured to progressively apply a breather sock in tubular form prior to, and during, application over the mandrel length as the mandrel exits the chute outlet; and
a film application assembly configured to progressively apply a film in tubular form over the breather sock covering the mandrel exiting the sock application assembly and thereby forming a film-sock-mandrel assembly.

2. The system of claim 1, wherein the sock application assembly comprises:
a sock reservoir comprising a lengthwise section of the chute at the chute outlet and having a reservoir outer surface configured to receive a gathered arrangement of the breather sock in a sock length that is at least as long as the mandrel length;
a sock baton having a baton outer surface and configured to be translated into engagement with the chute outlet;
one or more feeder mechanisms configured to engage the breather sock at the sock baton and draw the breather sock from a sock material spool and pull the breather sock over the sock baton and onto the sock reservoir; and
a sock cutting device configured to cut the breather sock after the sock length is loaded onto the sock reservoir.

3. The system of claim 2, wherein the sock application assembly comprises:
at least one baton ring clamp configured to clamp the breather sock to the baton outer surface during translation of the sock baton into engagement with the chute outlet, and configured to decouple from the baton outer surface to allow the breather sock to be pulled over the sock baton and accumulated in the gathered arrangement on the sock reservoir.

4. The system of claim 2, wherein:
the one or more feeder mechanisms comprise a pair of feeder mechanisms located on opposite sides of the sock reservoir and being positionable at the chute outlet for feeding the mandrel to the film application assembly.

5. The system of claim 1, wherein the film application assembly comprises:

a film collar located downstream of the chute outlet and having a collar outer surface;
a pair of film side clamps each having a plurality of vacuum apertures for vacuum coupling the film side clamps respectively to opposing sides of the film drawn from a film material spool, the film side clamps being movable away from each other for maintaining a free end of the film in an open configuration for installation onto the collar outer surface;
a film collar clamp configured to clamp the free end of the film against the collar outer surface prior to the mandrel exiting the film collar and entering the film; and
a film cutting device configured to cut the film to a film length that is at least as long as the mandrel length.

6. The system of claim 5, wherein the film application assembly comprises:
a heat sealing device included with at least one of the film side clamps and configured to heat seal a downstream end of the film after being cut to the film length that is at least as long as the mandrel length.

7. The system of claim 6, wherein the heat sealing device comprises:
a heating pad portion included on an inner surface of each film side clamp and configured to heat seal an end of the film when the film side clamps are moved together.

8. The system of claim 5, wherein the film application assembly comprises:
an air injection port included with the film collar and configured to inject air into the film and urge the film to extend along a downstream direction while the film is dispensed from the film material spool.

9. The system of claim 8, wherein the film application assembly comprises:
a collar diaphragm inside the film collar at a location upstream of the air injection port and configured to restrict airflow in an upstream direction past the collar diaphragm while allowing the mandrel to pass in a downstream direction.

10. The system of claim 1, wherein the film is a shrink wrap film, the system further comprising:
a heat shrink device located downstream of the film application assembly and configured to apply heat to the shrink wrap film of the film-sock-mandrel assembly in a manner causing the shrink wrap film to shrink and compress the breather sock against mandrel side surfaces of the mandrel.

11. A system for automated preparation of a mandrel for use in composite stringer manufacturing, comprising:
a U-shaped chute having a chute inlet and a chute outlet and configured to receive a mandrel having a mandrel length;
one or more feeder mechanisms configured to move the mandrel into the chute inlet and through the chute;
a sock application assembly having a sock material spool containing a continuous length of a breather sock in flattened form, the sock application assembly configured to progressively apply the breather sock in tubular form prior to, and during, application over the mandrel length as the mandrel exits the chute outlet; and
a film application assembly having a film material spool containing a continuous length of a film in tubular form, the film application assembly configured to progressively apply the film over the breather sock covering the mandrel exiting the sock application assembly and thereby forming a film-sock-mandrel assembly.

12. A method of preparing a mandrel for use in composite stringer manufacturing, comprising:

moving, through a U-shaped chute having a chute inlet and a chute outlet, a mandrel having a mandrel length;
progressively applying, using a sock application assembly, a breather sock in tubular form over the mandrel length as the mandrel exits the chute outlet, the breather sock is in tubular form prior to, and during, application over the mandrel length; and
progressively applying, using a film application assembly, a film in tubular form over the breather sock covering the mandrel as the mandrel exits the sock application assembly to thereby form a film-sock-mandrel assembly.

13. The method of claim 12, wherein the chute includes a sock reservoir comprising a lengthwise section of the chute at the chute outlet, the step of progressively applying the breather sock over the mandrel length comprising:
installing an end of the breather sock over a sock baton, the breather sock being drawn from a sock material spool;
translating the sock baton into engagement with the chute outlet;
pulling, using one or more feeder mechanisms, the breather sock over the sock baton and onto the sock reservoir;
accumulating, on the sock reservoir, a gathered arrangement of the breather sock in a sock length that is at least as long as the mandrel length; and
cutting, using a sock cutting device, the breather sock after the sock length is loaded onto the sock reservoir.

14. The method of claim 13, wherein progressively applying the breather sock over the mandrel length further comprises:
clamping, using at least one baton ring clamp, the breather sock against a baton outer surface during translation of the sock baton into engagement with the chute outlet; and
decoupling the at least one baton ring clamp from the baton outer surface prior to pulling the breather sock over the sock baton and onto the sock reservoir.

15. The method of claim 13, wherein pulling the breather sock over the sock baton and onto the sock reservoir comprises:
pulling the breather sock over the sock baton and onto the sock reservoir using a pair of feeder mechanisms located on opposite sides of the sock reservoir.

16. The method of claim 12, wherein progressively applying the film over the breather sock covering the mandrel comprises:
vacuum coupling opposing sides of the film respectively to a pair of film side clamps;
maintaining the film side clamps in spaced relation to each other for maintaining a free end of the film in an open configuration;
installing the free end of the film over a collar outer surface of a film collar located downstream of the chute outlet;
clamping, using a film collar clamp, the free end of the film against the collar outer surface prior to the mandrel exiting the film collar and entering the film; and
cutting, using a film cutting device, the film to a film length that is at least as long as the mandrel length.

17. The method of claim 16, wherein progressively applying the film over the breather sock covering the mandrel further comprises:
heat sealing, using a heat sealing device included with at least one of the film side clamps, a downstream end of the film after being cut to a film length that is at least as long as the mandrel length.

18. The method of claim 16, wherein progressively applying the film over the breather sock covering the mandrel further comprises:
  injecting air into the film using an air injection port included with the film collar; and
  urging the film to extend along a direction downstream of the film collar while the film is drawn from a film material spool.

19. The method of claim 18, wherein injecting air into the film further comprises:
  restricting airflow in an upstream direction using a collar diaphragm mounted in the film collar at a location upstream of the air injection port.

20. The method of claim 12, wherein the film is a shrink wrap film, the method further comprising:
  applying, using a heat shrink device located downstream of the shrink wrap assembly, heat to the shrink wrap film of the film-sock-mandrel assembly in a manner causing the shrink wrap film to shrink and compress the breather sock against mandrel side surfaces of the mandrel.

\* \* \* \* \*